US012754747B2

(12) United States Patent
Kumar et al.

(10) Patent No.: US 12,754,747 B2
(45) Date of Patent: Oct. 6, 2026

(54) SYSTEM AND METHOD FOR SIMULTANEOUSLY DISPLAYING MULTIPLE GUIs VIA THE SAME DISPLAY

(71) Applicant: APP-POP-UP INC., Steinbach (CA)

(72) Inventors: Rajeev Kumar, Disraeli (CA); Rakesh Kumar, Disraeli (CA)

(73) Assignee: APP-POP-UP INC., Windsor (CA)

( * ) Notice: Subject to any disclaimer, the term of this patent is extended or adjusted under 35 U.S.C. 154(b) by 163 days.

(21) Appl. No.: 18/429,396

(22) Filed: Jan. 31, 2024

(65) Prior Publication Data

US 2025/0245028 A1 Jul. 31, 2025

(51) Int. Cl.
*G06F 9/451* (2018.01)
*H04N 21/4722* (2011.01)

(52) U.S. Cl.
CPC ......... *G06F 9/451* (2018.02); *H04N 21/4722* (2013.01)

(58) Field of Classification Search
CPC ............................ G06F 9/451; H04N 21/4722
See application file for complete search history.

(56) References Cited

U.S. PATENT DOCUMENTS 11,089,342 B1 * 8/2021 Crane .................. H04N 21/812
2008/0115161 A1 * 5/2008 Kurzion ................. G06Q 30/02 725/62
2009/0006368 A1 * 1/2009 Mei .................... H04N 21/4667 707/999.005
2009/0024927 A1 * 1/2009 Schrock ................ H04L 67/306 715/722
2009/0199230 A1 * 8/2009 Kumar ............... G06Q 30/0268 725/32
2014/0123011 A1 * 5/2014 Ahuja .................. G06F 3/0481 715/719
2014/0247266 A1 * 9/2014 Young ................ H04N 21/4314 345/428
2019/0132650 A1 * 5/2019 Kedenburg, III .. H04N 21/4223
2019/0174168 A1 * 6/2019 Eubanks ............ H04N 21/4821

* cited by examiner

*Primary Examiner* — Mahelet Shiberou
(74) *Attorney, Agent, or Firm* — PRAXIS

(57) ABSTRACT

There is provided a system for modulating a graphical user interface (GUI). The system comprising a user device and a system controller in communication therewith. The user device comprises a device controller and a display interface for displaying the GUI. Execution of processor executable code stored in the system controller or provided for storage in the user device by the system controller or by the device controller or by the combination thereof synergistically provides for the system controller or the device controller or the combination thereof with performing computer-implementable steps. The computer implementable steps comprise splitting the GUI into two or more sub-GUI portions positioned within the GUI frame boundary and providing for the two or more sub-GUI portions to display respective content stored within the user device and/or hosted by the system controller and/or a same or different remote host controllers in communication with the user device.

6 Claims, 15 Drawing Sheets

SYSTEM AND METHOD FOR SIMULTANEOUSLY DISPLAYING MULTIPLE GUIs VIA THE SAME DISPLAY

TECHNICAL FIELD

The present disclosure generally relates to computer graphical user interfaces. More particularly, but not exclusively, the present disclosure relates to a system and method for simultaneously displaying multiple graphical user interfaces via the same display such as a screen.

BACKGROUND

A graphical user interfaces (GUI) is an interface through which a user interacts with electronic devices such as computers and smartphones through the use of icons, menus and other visual indicators or representations (graphics). A GUI is displayed via a display interface such as a display screen or a virtual screen created by the display screen of XR smart glasses for example. GUIs include the website being shown via a display interface or media windows streaming content and being positioned on a host GUI such as website as is known in various platforms like Facebook™ and YouTube™. While streaming content via a media window, the content is interrupted to stream other content such as an advertisement.

Objects

An object of the present disclosure, there is provided a system for modulating a graphical user interface (GUI) for splitting the GUI into two or more sub-GUI portions.

SUMMARY

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising: splitting the GUI into at least two sub-GUI portions positioned within the GUI frame boundary, one of the at least two sub-GUI portions being a main sub-GUI, the other of the at least two sub-GUI portions being an auxiliary sub-GUI; providing the main sub-GUI to display a main media player for streaming main content selected by the user via input commands therefor and stored within the user device and/or hosted by the system controller and/or a same or different remote host controllers in communication with the user device; providing the auxiliary sub-GUI to display a plurality of auxiliary media thumbnails, the auxiliary sub-GUI being scrollable; automatically opening without user input commands therefor a given one of the plurality of media thumbnails to provide a media player for streaming auxiliary content and simultaneously automatically pausing the main content in the main media player for a given time period after which the main content resumes streaming; providing the auxiliary content to stream during the time period of automatic pausing of the main content and for a given additional time period when the main content resumes streaming; automatically muting the auxiliary content during the additional time period; blocking user input commands for stopping streaming of the auxiliary content until completion of the additional time period.

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising: splitting the GUI into at least two sub-GUI portions positioned within the GUI frame boundary, one of the at least two sub-GUI portions being a main sub-GUI, the other of the at least two sub-GUI portions being an auxiliary sub-GUI; providing the main sub-GUI to display a main media player for streaming main content selected by the user via input commands therefor and stored within the user device and/or hosted by the system controller and/or a same or different remote host controllers in communication with the user device; providing the auxiliary sub-GUI to display a plurality of auxiliary media thumbnails, the auxiliary sub-GUI being scrollable; and providing a user to slide and drop a given one of the plurality of media thumbnails into the main media player, whereby auxiliary content replaces the main content, the auxiliary content being related to the given one of the plurality of media thumbnails, wherein the auxiliary content is stored within the user device and/or hosted by the system controller and/or a same or different remote host controllers in communication with the user device.

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising: splitting the GUI into at least two sub-GUI portions positioned within the GUI frame boundary, one of the at least two sub-GUI portions being a main sub-GUI, the other of the at least two sub-GUI portions being an auxiliary sub-GUI, the auxiliary sub-GUI being scrollable; providing a user to slide and reposition the main sub-GUI along a length and a width of the auxiliary sub-GUI.

In an embodiment of the system defined in paragraph 0006 the main sub-GUI comprises a main media player for streaming main content selected by the user via input commands therefor and stored within the user device and/or hosted by the system controller and/or a same or different remote host controllers in communication with the user device; and wherein the auxiliary sub-GUI comprises a plurality of auxiliary media players for streaming auxiliary content stored within the user device and/or hosted by the system controller and/or a same or different remote host controllers in communication with the user device.

In an embodiment of the system defined in paragraph 0006, the main sub-GUI is non-scrollable.

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising: splitting the GUI into at least three sub-GUI portions positioned within the GUI frame boundary, one of the at least two sub-GUI portions being a main sub-GUI, the other of the at least two sub-GUI portions being first and second auxiliary sub-GUIs, the first and second auxiliary sub-GUIs being scrollable in the same or different directions; and providing for each of the at least three sub-GUIs to display respective content stored within the user device and/or hosted by the system controller and/or a same or different remote host controllers in communication with the user device.

In accordance with an aspect of the present disclosure, there is provided a system for modulating a graphical user interface (GUI), the system comprising: a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising: identifying black areas about a media player in the GUI; and providing a sub-GUI portion in each of the respective black areas, wherein each of the sub-GUI portions provided in the respective black areas provides for displaying respective content stored within the user device and/or hosted by the system controller and/or a same or different remote host controllers in communication with the user device. Other objects, advantages and features of the present disclosure will become more apparent upon reading of the following non-restrictive description of illustrative embodiments thereof, given by way of example only with reference to the accompanying drawings.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

The following drawings form part of the present specification and present disclosure. In the appended drawings.

DETAILED DESCRIPTION

Figure 1:
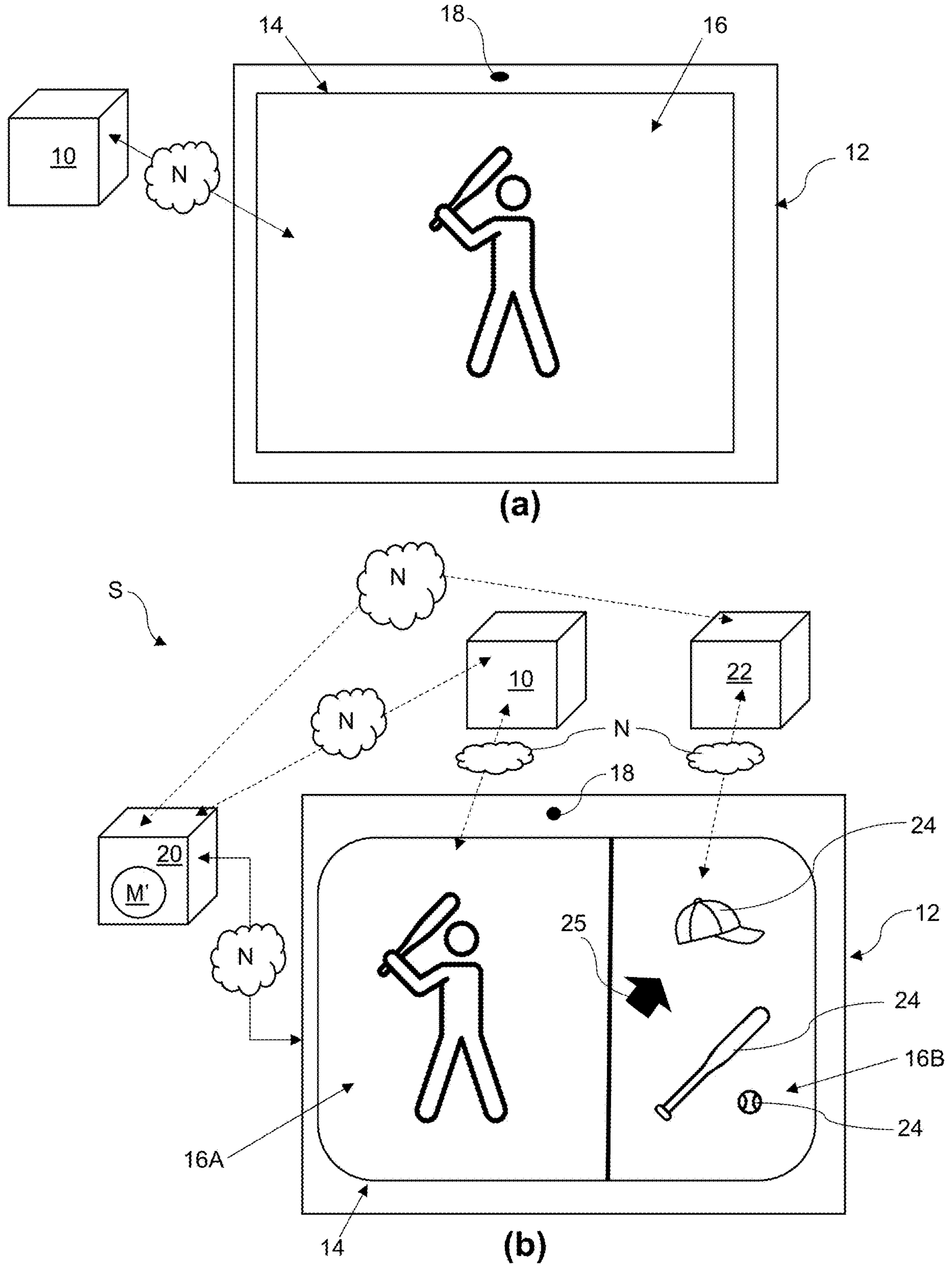
FIG. 1 is a schematic representation of a system for simultaneously displaying multiple graphical user interfaces via the same display showing a display running a user interface generated by a controller hosting a programme therefor in (a) and an interface system in (b) for simultaneously displaying multiple graphical user interfaces via the same display shown running the same graphical user interface in (a) via the same display in addition to simultaneously running another graphical user interface generated by the same or another controller hosting a programme therefor in accordance with a non-restrictive illustrative embodiment of the present disclosure.

Generally stated, there is provided a system for modulating a graphical user interface (GUI). The system comprises a user device comprising a device controller with an associated memory and a display interface for displaying the GUI. The GUI defines a frame boundary thereof further defining a GUI size. The GUI comprises content displayed via the display interface. A system controller is in communication with the user device. The system controller has a processor with an associated memory of processor executable code for being executed by the system controller or for being downloaded into the memory of the user device controller to be executed thereby or to be executed synergistically by a combination of the system controller and the device controller. Execution of the processor executable code by the system controller or by the device controller or by the combination thereof synergistically provides for the system controller or the device controller or the combination thereof with performing computer-implementable steps.

In an embodiment, the computer-implementable steps comprise splitting the GUI into at least two sub-GUI portions positioned within the GUI frame boundary. One of the at least two sub-GUI portions being a main sub-GUIs and the other of the at least two sub-GUI portions being an auxiliary sub-GUI. The main sub-GUI is provided to display a main media player for streaming main content selected by the user via input commands therefor and stored within the user device and/or hosted by the system controller and/or a same or different remote host controllers in communication with the user device. An auxiliary sub-GUI is provided to display a plurality of auxiliary media thumbnails. The auxiliary sub-GUI being scrollable. A given one of the plurality of media thumbnails is automatically opened without user input commands therefor to provide a media player for streaming auxiliary content and the main content in the main media player is simultaneously automatically paused for a given time period after which the main content resumes streaming. The auxiliary content is streamed during the time period of automatic pausing of the main content as well as for a given additional time period when the main content resumes streaming. The system automatically mutes the auxiliary content during the additional time period and blocks user input commands for stopping streaming of the auxiliary content until completion of the additional time period.

In an embodiment, the computer implementable steps comprise splitting the GUI into at least two sub-GUI portions positioned within the GUI frame boundary. One of the at least two sub-GUI portions being a main sub-GUI and the other of the at least two sub-GUI portions being an auxiliary sub-GUI. The system provides the main sub-GUI to display a main media player for streaming main content selected by the user via input commands therefor and stored within the user device and/or hosted by the system controller and/or a same or different remote host controllers in communication with the user device. The system provides the auxiliary sub-GUI to display a plurality of auxiliary media thumbnails. The auxiliary sub-GUI is scrollable. The system provides a user to drag/slide and drop a given one of the plurality of media thumbnails into the main media player. The auxiliary content replaces the main content. The auxiliary content is related to the given one of the plurality of media thumbnails. The auxiliary content is stored within the user device and/or hosted by the system controller and/or a same or different remote host controllers in communication with the user device.

In an embodiment, the computer-implementable steps comprise splitting the GUI into at least two sub-GUI portions positioned within the GUI frame boundary. One of the at least two sub-GUI portions is a main sub-GUI and the other of the at least two sub-GUI portions is an auxiliary sub-GUI. The auxiliary sub-GUI is scrollable. The system provides a user to slide and reposition the main sub-GUI along a length and a width of the auxiliary sub-GUI. In an embodiment, the main sub-GUI comprises a main media player for streaming main content selected by the user via input commands therefor and stored within the user device and/or hosted by the system controller and/or a same or different remote host controllers in communication with the user device. In an embodiment, the auxiliary sub-GUI comprises a plurality of auxiliary media players for streaming auxiliary content stored within the user device and/or hosted by the system controller and/or a same or different remote host controllers in communication with the user device.

In an embodiment of the system defined in paragraph 0006, the main sub-GUI is non-scrollable.

In an embodiment, the computer-implementable steps comprise splitting the GUI into at least three sub-GUI portions positioned within the GUI frame boundary. One of the at least two sub-GUI portions is a main sub-GUI. The other of the at least two sub-GUI portions are first and second auxiliary sub-GUIs. The first and second auxiliary sub-GUIs are scrollable in the same or different directions. Each of the at least three sub-GUIs is provided to display respective content stored within the user device and/or hosted by the system controller and/or a same or different remote host controllers in communication with the user device.

In an embodiment, the computer-implementable steps comprise identifying black areas about a media player in the GUI. A sub-GUI portion in each of the respective black areas is provided. Each of the sub-GUI portions provided in the respective black areas provides for displaying respective content stored within the user device and/or hosted by the system controller and/or a same or different remote host controllers in communication with the user device.

With reference to FIG. 1, there is shown in (a) a remote server 10 hosting a program that is being run on a user device 12 via a network N communication. The user device 12 comprises an integrated device controller (not shown), a device interface in the form of a display screen 14 for displaying a user interface 16 and an image capturing device 18. In (b), there is shown a system S for simultaneously displaying multiple user interfaces via the same display. The system S comprises a controller 20 in a network N communication with device 12. The controller 20 has an associated memory M' of controller executable code that when executed provides for performing the computer implementable step of separating or splitting the user interface 16 into at least two interface portions or sub-interfaces 16A and 16B. Indeed, the screen 14 continues to run or display the program of host server 10 (in interface portion 16A) but in tandem it also runs a program from another host server 22 (in interface portion 16B). Of course, the programs producing the visual displays in interface portions 16A or 16B may be from the same host server (10 or 22, for example). In an example, interface portion 16A shows a sporting event while interface portion 16B juxtaposed to sub-interface 16A provides for advertising articles 24. Indeed articles 24 may be input images as described in U.S. Ser. No. 17/443,563 and can be operated by touch commands, cursor clicks, eye orientations (e.g., Φ) as described in U.S. Ser. No. 17/443,563, voice commands and combinations thereof.

In an embodiment, the controller 20 provides for the user device 12 to access both programs from both hosts 10 and 22 (or a single host or multiple host as can be contemplated by the skilled artisan) or the controller 20 communicates via a network N with these hosts 10 and 22 to receive their program data and to recommunicate this data to the device 12 in a single visual display on the same screen 14 separated or split in portions to run both programs simultaneously.

Thus, the controller 20 (i.e. a server, cloud server or network of servers or data center and the like) of the system S provides by computer implementable steps to run two different programs on the user device 12 (e.g. handheld tablet) via the controller thereof, in order to display two different and unrelated interfaces or sub-interfaces or interface portions 16A and 16B. The controller 20 can return to one of the two or more juxtaposed interfaces and hence run one program. Thus, the controller 20 provides for advertising in tandem or providing options to the user for advertisements or provide options to the user to watch another simultaneous event or view highlights of that simultaneous event and so one and so forth.

In an embodiment, the system S provides for the user to choose to run more than one program on their display device screen 14. Thus, the controller 20 separates the interface 16 is portions 16A and 16B based on an X,Y cartesian table of pixels, where a portion of the pixels will display one program and another portion of the pixels will display another program.

Figure 2:
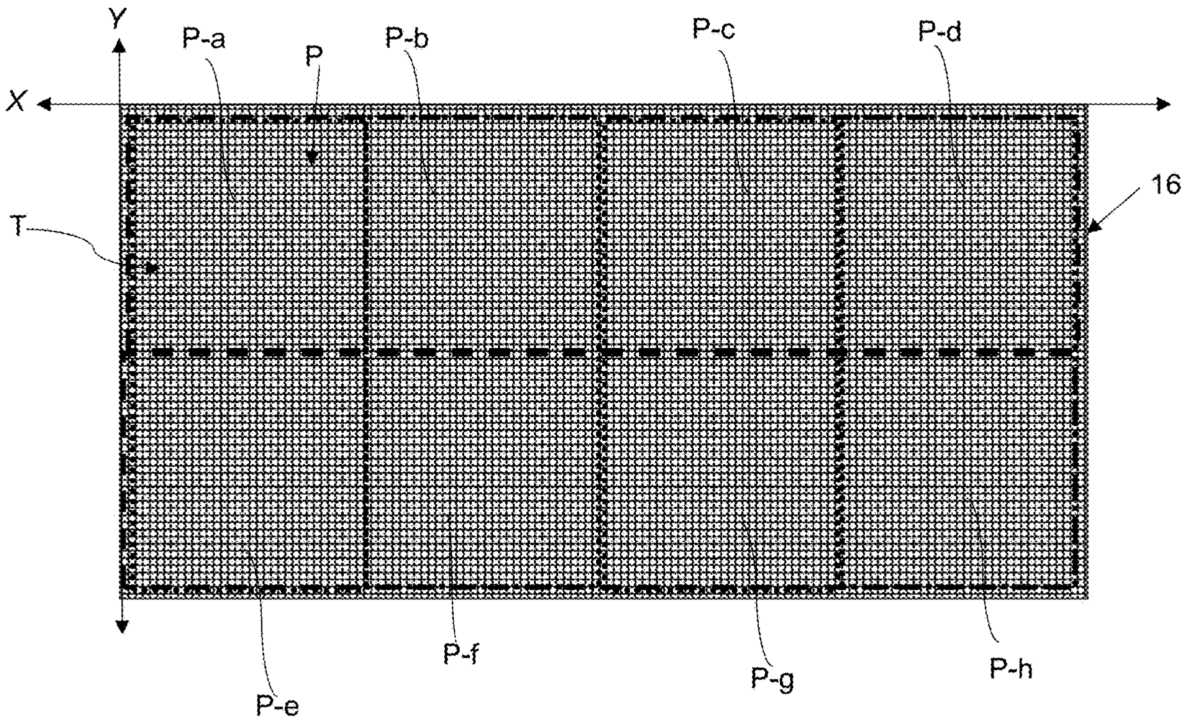
FIG. 2 is a schematic representation of computer generated cartesian table of a displayed graphical user interface of the present system with one more computer-generated interface display portions of the graphical user interface in accordance with a non-restrictive illustrative embodiment of the present disclosure.

Turning now to FIG. 2, the system S and method herein provide by way of the computer-implemented steps for generating a cartesian table T of a display screen 14 for displaying a graphical user interface 16. The cartesian table T includes a vertical Y axis and a horizonal X axis defining a plurality of given coordinates ($X_n$, $Y_n$) for each given pixel P. Thus, the controller provides for separating a graphical user interface into interface portions thereof such as portions P-a, P-b, P-c, P-d, P-e, P-f, P-g, P-h. A given portion P-a contains pixels P within coordinates (Xa', Ya') to (Xa" Ya"). As such, the system and method by way of the computer implementable steps determine which display screen portions (P-a to P-h) will display a given program. Therefore, the system and method herein provide for a graphical user interface 16 to display a given program in a given one or given ones of these portions from one or more host servers as previously explained.

Of course, the interface 16 may be separated in any number of portions as is visually and usefully convenient. The size of the portions may be modulated by the controller 20, the user, the program hosts and combinations thereof. Thus, any convenient ratio can be used for screen splitting. Moreover, the screen can be split vertically as shown in (b) of FIG. 1 or horizontally. The foregoing may be modulated by the controller 20, the user, the program hosts and combinations thereof.

As such, in one example, a user can enjoy a sporting event or other online streaming product and can simultaneously view advertising without interruption of their main entertainment as two interfaces are being simultaneously run by the system S. The user can also purchase products in tandem via an input image as described in U.S. Ser. No. 17/443,563. Indeed, the double interface shown in (b) of FIG. 1 may also include a command input image as described in U.S. Ser. No. 17/443,563 such as a cursor 25 that moves with the field of view orientation Φ as described in U.S. Ser. No. 17/443,563 to move across both sub-interfaces 16A and 16B so that the user can input commands via the cursor by clicking, voice commands and the like. The input image may include other command input applications and not be a cursor but an icon or window for receiving one more input commands.

In an embodiment, the systems herein provide for users to open an application in order to access the systems and methods herein, as such, in one example, the user opens the system application which identifies the user via visual recognition (face, eyes, iris), or touch recognition, or fingerprint recognition, or via voice command or a security password or any combination thereof. As such, the application provides for accessing one or more of the operating systems herein, such as the ability to modulate and/or operate input images via eye orientation Φ as described in U.S. Ser. No. 17/443,563, the ability for the system to split the user interface and display two or more programs in tandem, the ability for the user to move an input image (such as a cursor, or a game console image) along one interface or a plurality of juxtaposed interfaces or interface portions or sub-interfaces via the same display screen including selectively rendering the command input image visible or invisible by user input commands or by predetermined computer-implementable steps.

Figure 3:
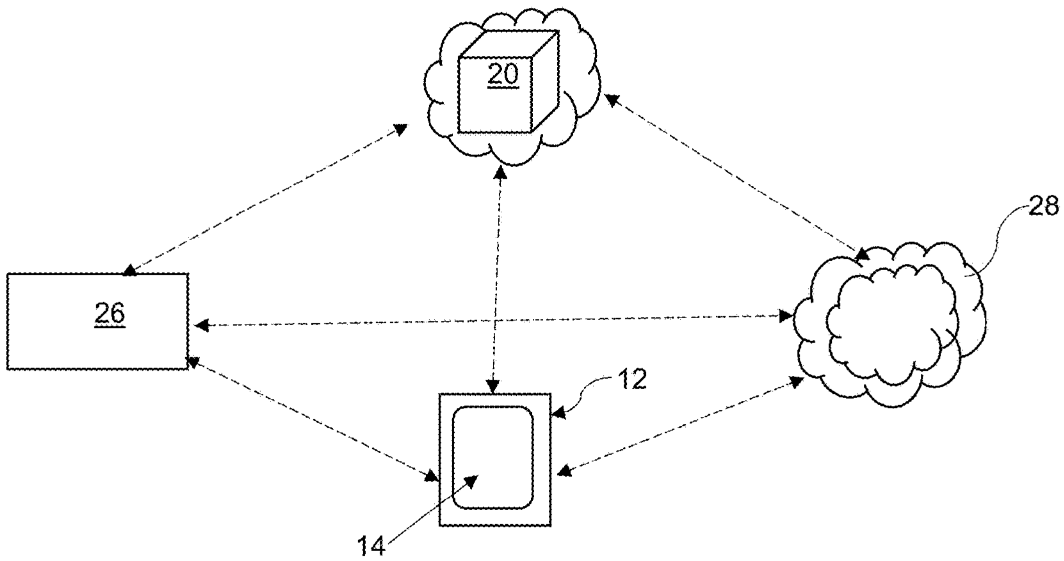
FIG. 3 is a schematic a system for simultaneously displaying multiple graphical user interfaces via the same display in accordance with a non-restrictive illustrative embodiment of the present disclosure.

FIG. 3 shows the system S comprising the controller 20 such as a cloud server, in remote operative communication with the user display device 12. There is also shown a data center 26 and a content delivery network (CND) 28. Various operative communications can be provided within the communication architecture of system S.

The controller 20 can be in remote operative communication with the data center 26 and/or the CDN 28. The data center 26 and the CDN 28 can be in remote operative communication. The data center 26 and/or the CDN 28 can be in remote operative communication with the user device 12. In this way, the controller 20 can modulate the graphical user interface 16 of the user device 12 by receiving the content for display from the data center 26 and/or the CDN 28 directly and modulating the content at the controller level in order to transmit the content to the user device 12 for display in the modulated format. It is understood that the modulation referred to herein refers to the selective separating/splitting (or resizing) of the graphical user interface 16 as provided herein.

In an embodiment, the user device 12 receives content directly from the data center 26 and CDN 28 and the displayed content is modulated by the controller 20 at the device 12 level for simultaneous display as provided herein. In an embodiment, the user device 12 communicates with the data center 26 and/or the CDN 28 directly to access content for display. In another embodiment, the user device 12 communicates with the data center 26 and/or the CDN 28 via the controller 20 to access content for display.

Figure 4:
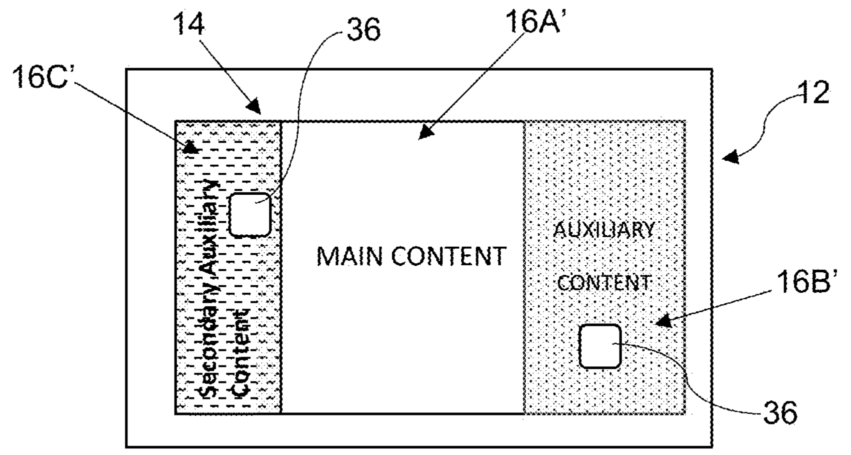
FIG. 4 shows a display device with the graphical user interface having been separated by the controller to provide for three interface portions for simultaneously displaying via the screen the main content in addition to auxiliary content as well as secondary auxiliary content in accordance with a non-restrictive illustrative embodiment of the present disclosure.

In an embodiment, as shown in FIG. 4, a secondary auxiliary portion 16C' is provided in which the user can view secondary auxiliary content. For example, the secondary auxiliary content may provide purchase information related to the product advertised in the auxiliary content displayed via the auxiliary portion 16B'. In an embodiment, the auxiliary portion 16B' or the secondary auxiliary portion 16C' provide for communicating with the merchant via a communications window 36 for example, to receive merchant information related to the advertised content. The secondary auxiliary portion 16C' can be generated by the user clicking on the auxiliary portion 16B' or by the user inputting a command therefor via the input command image 32.

In an embodiment, the auxiliary content does not include sound and thus, there is no interruption of the main content sound. In an embodiment, the auxiliary content includes sound and when the system S runs auxiliary content, the sound of the main content is muted, and the user can only experience the main content visually as the only sound emitted is that of the auxiliary content.

Figure 5:
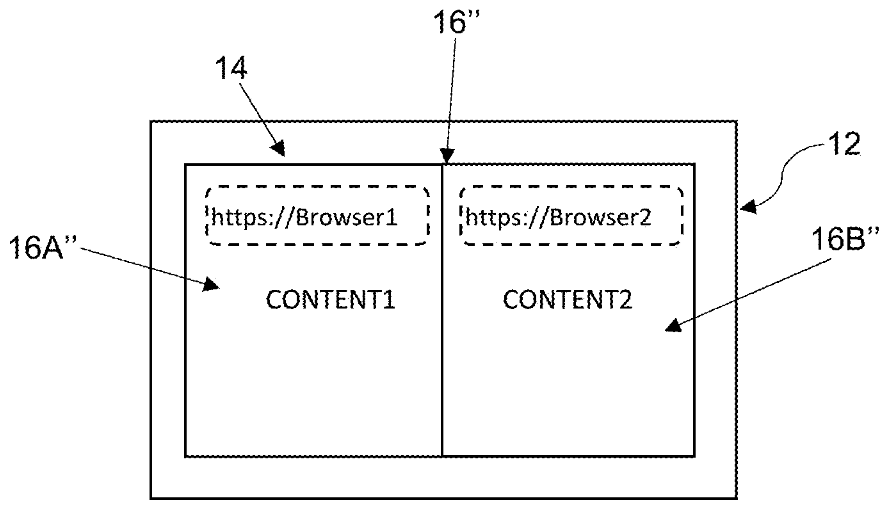
FIG. 5 shows a display device with a screen in operative communication with the system controller simultaneously displaying two browser pages in respective interface portions via the same screen in accordance with a non-restrictive illustrative embodiment of the present disclosure.
Figure 6A:
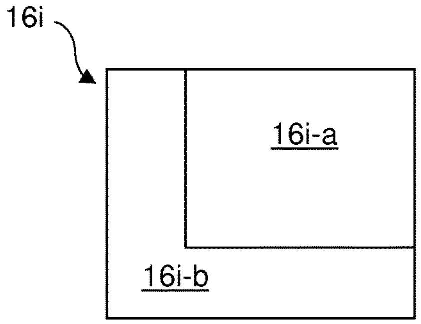
FIG. 6A shows a separated interface display configuration with two interface display portions thereof simultaneously displaying respective content in accordance with a non-restrictive illustrative embodiment of the present disclosure.
Figure 6B:
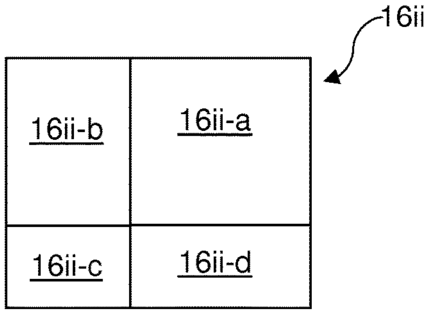
FIG. 6B shows a separated interface display configuration with two four display portions thereof simultaneously displaying respective content in accordance with a non-restrictive illustrative embodiment of the present disclosure.
Figure 6C:
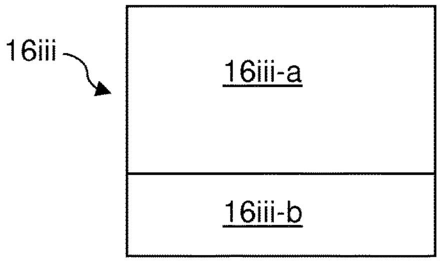
FIG. 6C shows a separated interface display configuration with two interface display portions thereof simultaneously displaying respective content in accordance with a non-restrictive illustrative embodiment of the present disclosure.
Figure 6D:
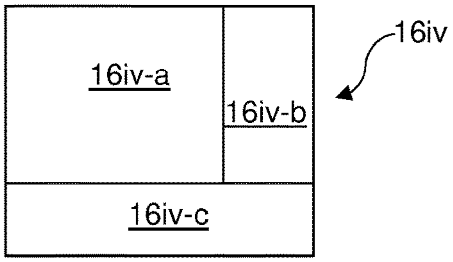
FIG. 6D shows a separated interface display configuration with two three display portions thereof simultaneously displaying respective content in accordance with a non-restrictive illustrative embodiment of the present disclosure.
Figure 6E:
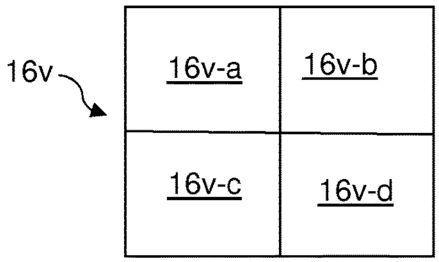
FIG. 6E shows a separated interface display configuration with two four display portions thereof simultaneously displaying respective content in accordance with a non-restrictive illustrative embodiment of the present disclosure.
Figure 6F:
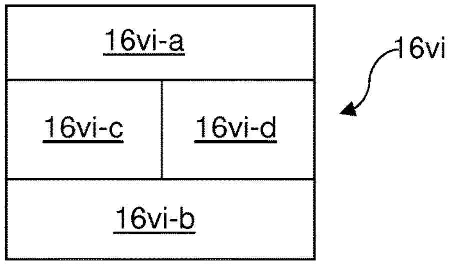
FIG. 6F shows a separated interface display configuration with two four display portions thereof simultaneously displaying respective content in accordance with a non-restrictive illustrative embodiment of the present disclosure.

In an embodiment, shown in FIG. 5, an interface 16" is split into two independent sub-interfaces 16A" and 16B" allowing for running two independent browsers simultaneously or two different apps simultaneously. In this case, there is no main content per se, there is simply multiple content on respective portions. Of course, more portions can be provided with more browsers and/or applications. In an embodiment, the one of the sub-interfaces runs a browser and another an app.

In an embodiment, when viewing main content on an interface 16', the user can choose to share this main content, and this split the screen to produce a main interface portion 16A' showing the main content without interruption and an auxiliary interface portion 16B' providing an input page to enter email, phone number, name or other contact information so as to share the main content with one or more contacts. This information can be entered by keyboard inputs, by selecting a name in a contact list or by voice command. Thus, in an embodiment, the user profile 30 contains or has access to a user contact list.

The user can click on the interface 16' and input command images 31 can be generated with various possible auxiliary content such as an advertisement page, a browser page or a share page and the like.

In an embodiment, the auxiliary content is a social media page and the main content is shared in the social media page by dragging and dropping or simply by a click or other like commands including voice commands, touch commands or social media page commands. Indeed, the user can simultaneously view main content and participate in a social media network in the auxiliary content part of their screen commenting on the main content which can be media, a movie, a sporting event, news events, a video game and other accessible content.

In an embodiment, when sharing content as provided herein, the controller 20 may have the user profile 30 of the individual the content is being sent to and thus in the case where this user is viewing main content on their interface 16', the controller 20 can inform the user via a visual or audial cue or via an input command image 31 that a sender wishes to share content. Thus, the receiving individual can request a screen split or resizing (i.e. interface separating) with their main content continuing to be displayed via an interface portion 16A' and the shared content being shown via the auxiliary portion 16B'.

In an embodiment, when the main content is a commercial or infomercial and the user wishes to purchase a given product advertised in the main content, user input commands provide for auxiliary content to be simultaneously displayed in the split screen or resized interface mode provided herein in order to run an online shopping page where the advertised product or products can be purchased.

Examples of configurations in screens, content can be changed from one sub-interface to another, different resizing or splitting shapes, user can select which ones they like when viewing, the resizing can be done based on user's device screen.

In an embodiment, the step of separating the interface into interface portion comprises the controller 20 providing the device 12 with an application to be stored thereon that allows for user inputs prompted and or unprompted to separate in an interface into portions thereof simultaneous display of separate content. The application communicates with the controller 20 via the device 12 which knows that a split has occurred and can allow additional content to be shown on the additional interface portion or portions as provided herein. Thus, in this case it is not the controller 20 that separates the interface but an application stored on the device 12 provided by the controller 20 and in communication therewith.

The controller 20 is in communication with the device 12 and detects the size, shape and configuration of the screen as well as the pixels in the cartesian table T or T' thereof in order to resize the screen in a suitable split screen mode or coni Different types of splits will be required for different types of screens depending on the device being used. For example, a smartphone, a tablet, a laptop, a smart TV have different screen sizes and different pixel definitions, and this requires different screen split configurations.

Turning to FIGS. 6A, 6B, 6C, 6D, 6E and 6F there are shown non-limiting examples of separated interfaces 16*i*, 16*ii*, 16*iii*, 16*iv*, 16*v*, and 16*vi* respectively. In this example, interface 16*i* is separated in a square interface portion 16*i-a* and an L-shaped portion 16*i-b*. Interface 16*ii* is separated horizontally and vertically with four portions 16*ii-a*, 16*ii-b*, 16*ii-c*, and 16*ii-d*. Interface 16*iii* is separated horizontally with a top larger portion 16*iii-a* and a bottom narrower portion 16*iii-b*. Interface 16*iv* is separated vertically with main a portion 16*iv-a* and an auxiliary portion 16*iv-b* and is also separated horizontally providing a secondary auxiliary portion 16*iv-c*. Interface 16*v* is separated vertically and horizontally in four equal square portions 16*v-a*, 16*v-b*, 16*v-c* and 16*v-d*. Interface 16*vi* is separated horizontally with a top portion 16*vi-a*, a bottom portion 16*vi-b*, and two vertically separated median portions 16*vi-c* and 16*vi-d*.

Figure 7:
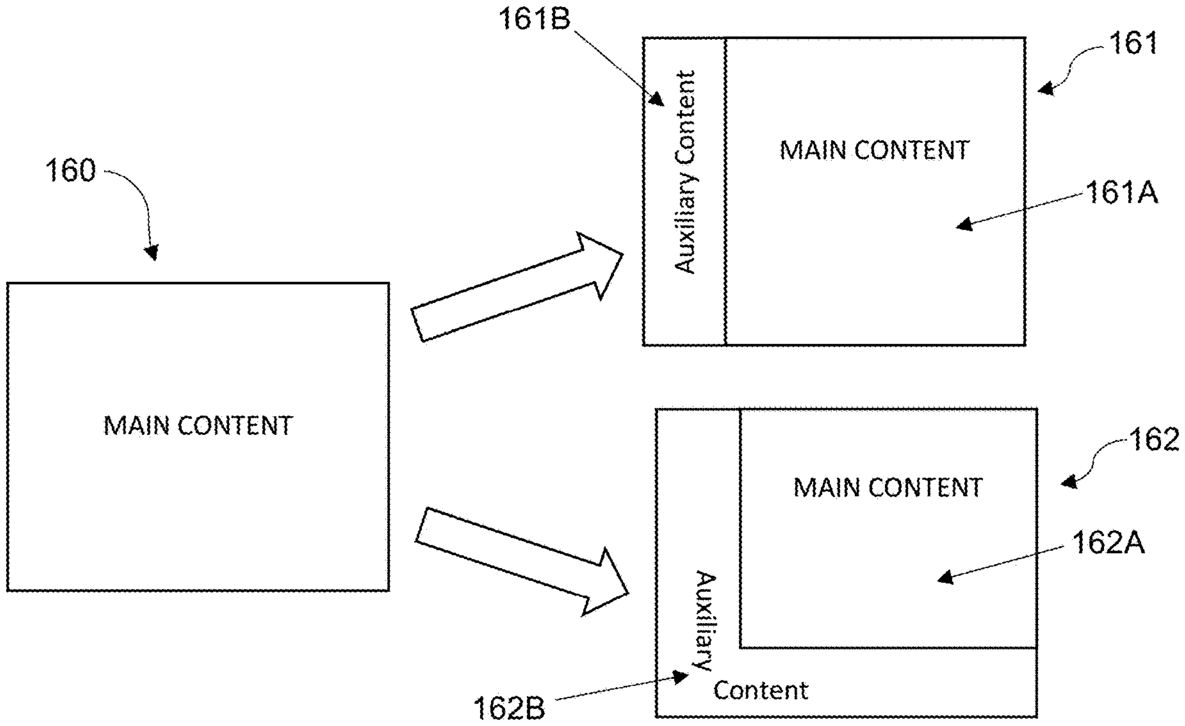
FIG. 7 is a schematic representation of an interface display displaying main content being separated into two different possible separated interface configurations for simultaneously displaying main content in a main interface display portion and auxiliary content in an auxiliary display portion in accordance with a non-restrictive illustrative embodiment of the present disclosure.

Turning now to FIG. 7, there is shown a graphical user interface 160 that the controller 20 can separate into a first separated mode configuration 161 or a second separated mode configuration 162 for example. In configuration 161, the main content shown in interface 160 is being displayed in main interface portion 161A and auxiliary content is being displayed in the auxiliary left band portion 161B. In configuration 162, the main content is being displayed in main interface portion 162A and the auxiliary content is being displayed in auxiliary L band portion 162B. The controller 20 provides for advertisements to be streamed in the auxiliary portions 1618 or 162B while the main content of interface 160 is shown in its entirety without being covered by bands but simply being resized into interface portions 161A or 161B. This way, an advertisement can be simultaneously streamed with the main content being streamed without interruption or blockage (as it is re-sized). In an embodiment, the advertisements of the auxiliary content have no sound and enjoyment of the main content is not compromised.

Of course, still other configurations with more or less portions can also be provided as will be readily understood by the skilled artisan.

Moreover, the user can switch the content displayed in the various portions in other words content shown in one given portion can be shown in another an vice versa with an input command that is communicated to the controller 20 or that is provided by the application stored on the device 12 as previously explained. The user can also select a preferred split mode configuration. The controller 20 can provide the user with a selection of interface divided configurations and the user's choices are registered in their profile 30 so that interface separation for a given user is based on the user's preferences.

In an embodiment, the add blocker of a user's device 12 will not block auxiliary content (if it is desired) on the auxiliary portion. In this case, a host server (10 or 22 in FIG. 1 for example) sends its content to the user device 12 via the controller 20 which allows the content to be shown in the auxiliary interface portion bypassing the add blocker as it is the controller 20 that is sending the content to the user device 12 and not the host server (such as 10 or 22). Of course, in an embodiment, this is configurable by the user and can be registered in their profile 30.

In an embodiment, system users can download or stream a video game from a server including the controller 20 or another host server 10 or 22, or the data center 26 or the CDN 28 etc. In any event, the controller 20 is in remote and operative communication with the user's device 10. During game play, the controller 20 can execute the computer implementable step of separating or splitting the screen interface display as provided herein to run an advertisement in an auxiliary interface portion as provided herein. The controller 20 can also stop the game thereby pausing the current play to run auxiliary content in the auxiliary interface portion but the user's device remains connected with the server through the network so that server can split the user's device screen or stop the video game during playing of the video game to run ads.

A graphical user interface or GUI is both the program being hosted on server for being displayed and the display itself. The terms interface and GUI are interchangeable. An interface portion or a GUI portion is a portion of the overall GUI being displayed through the same screen. Yet an interface portion is also a separate GUI unto itself. An interface display is the interface being displayed through a device display (e.g. screen). An interface display portion is a part of the over visual frame or interface that hosts a separate GUI. Each interface display portion displays its own GUI (i.e. content). The content can be a stream, a video, a video game, or another interactive GUI etc. In essence, the visual display of the screen is being split into separate displays with respective content that are independent from one another much like having multiple devices with respective screens. Yet, in this case multiple content can be viewed via the same screen. Separating, dividing, or splitting the screen/interface can also be referred to as resizing the screen/interface wherein the main content being shown in the full screen is resized to become smaller as to fit another one or more interface display portions with respective content for simultaneous display via the same screen. Resizing also includes enlarging a given interface display portion to the full size of the interface display provided by the screen while removing the other portions and thus the resized portion becomes the interface display displaying its own and the sole GUI rather than multiple GUIs. Of course, resizing also includes reducing the size of main content running in the full screen (interface display) to be displayed in a smaller portion of the display thus allowing for other interface display portions to simultaneously run other content.

Generally, a framework is a layered structure indicating what kind of programs can or should be built and how they would interrelate. GUIs are built on a framework. In an embodiment, the framework of the GUI is modulated (modified, changed, replaced etc.). In an example, the system controller 20 executes the computer implementable step of modulating the framework of the user interface 16. Indeed, the system controller 20 modifies the interface software framework running on the user device 12 (i.e., stored within the memory thereof). In an embodiment, the system controller 20 adds or changes the interface framework of the user device 12. The foregoing provides for simultaneously displaying more than one content stream. The foregoing is provided by splitting a media window in a GUI into two or more media sub-windows.

In an embodiment, the system controller 20 provides for the user device 12 to download an application in its memory providing the user via user input commands to split the screen as defined herein or splitting the GUI of a media window in a GUI. In an embodiment the system controller 20 provides for the user device 12 to download an application in its memory providing the user via user input commands to resize the GUI or portions thereof (following splitting) as provided herein. In an embodiment, the foregoing application is contained within another application. Thus, when a user wishes to download a given app they concurrently download into their device the application allowing their device to displaying multiple graphical user interfaces via the same display as provided herein and to modulate the multiple graphical user interfaces as provided herein.

Figure 8:
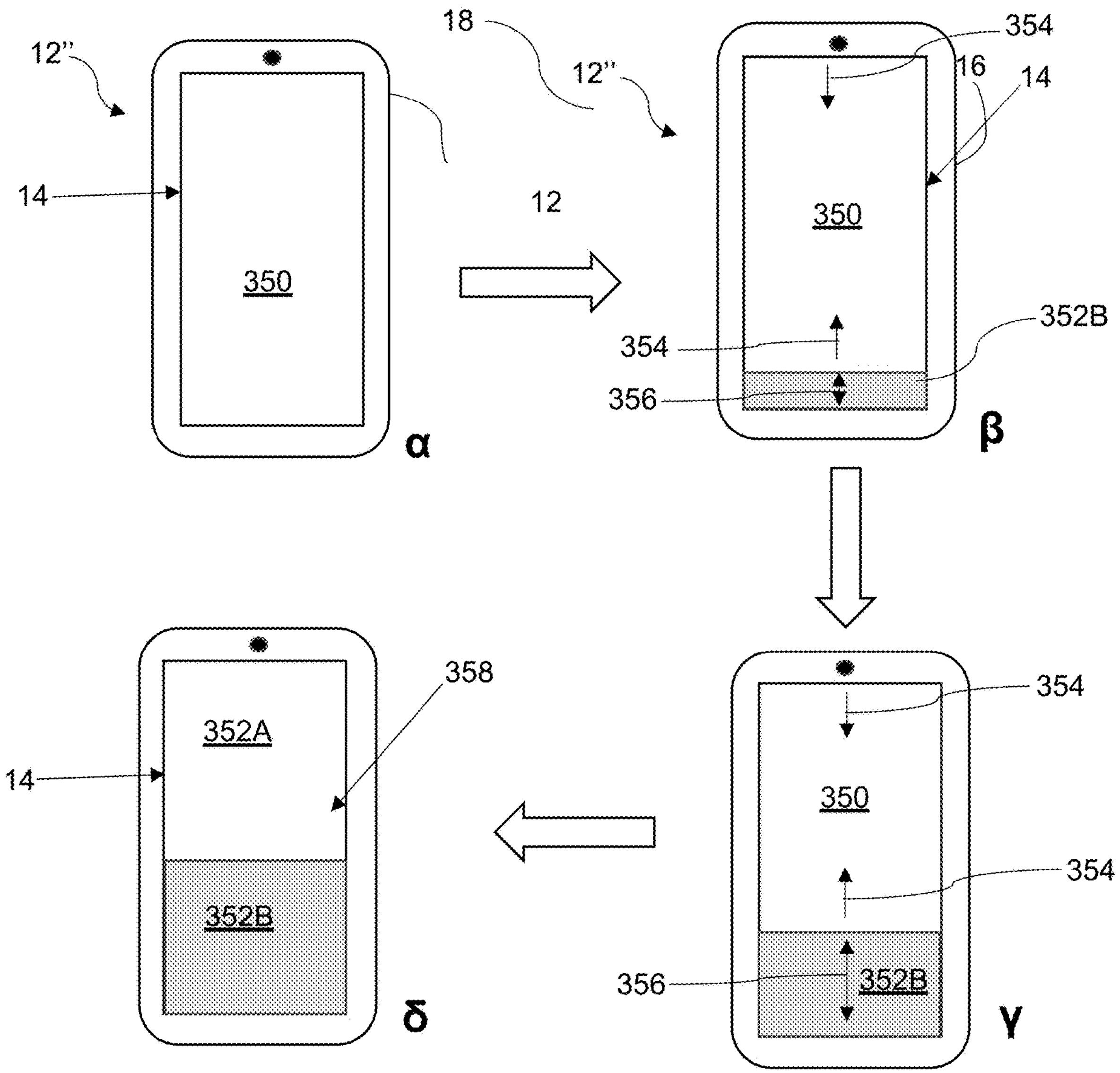
FIG. 8 is a schematic representation of sequential splitting of a GUI displayed via a screen on a user device showing various time stamps of the splitting from α-δ, in accordance with a non-restrictive illustrative embodiment of the present disclosure.

Turning now to FIG. 8 the term splitting or dividing a GUI or a media window as provided herein also includes resizing an GUI/window by progressively decreasing the width or length thereof and simultaneously progressively increasing the width or length of a new GUI/window which will share the space taken by the original GUI/window to a predetermined size of the original GUI/Window and new GUI/Window.

FIG. 8 shows a device 12" such as a mobile device with a display screen 14 displaying a GUI 350 at step (a) which spans the width and length of the screen 14 in this example. When the GUI is 350 is split into sub-portions thereof, the new GUI sub-portion 352B appears as along a sliver of the screen 14 concurrently decreasing by the same sliver the original GUI 350 and progressively increases in size (along its length or height in this example) correspondingly progressively decreasing the size of the original GUI 350 (along its length or height in this example) as shown in steps (B) and (v) and as indicated by the inward arrows 354 which represent a decrease in size and the outward arrows 356 which represent an increase in size. The foregoing mutual resizing occurs in one quick swoop until the resulting multiple GUI display 358 is created which is the size of the original GUI 350 at step (a) but now having been split within the same boundary frame 360 between two sub-portions, namely sub-GUI portion 352A (which is the original GUI 350 displaying the original content thereof in a decreased sized version) and sub-GUI portion 352B which is the new GUI.

Figure 9:
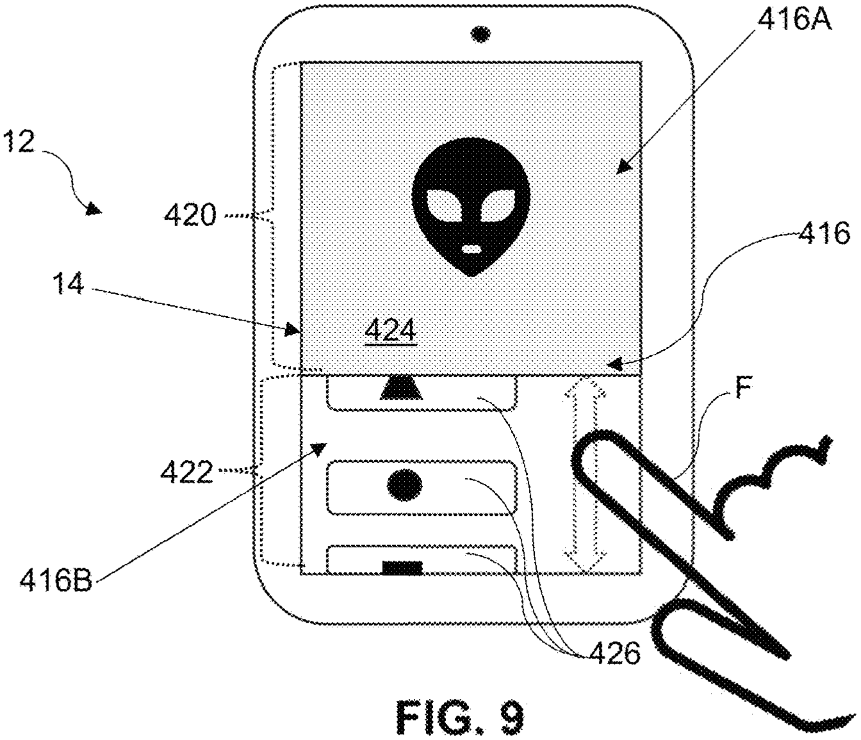
FIG. 9 is a schematic representation of a display screen and a user interface split into two sub-GUI portions, one portion being scrollable and the other non-scrollable or fixed in accordance with a non-restrictive illustrative embodiment of the present disclosure.

FIG. 9 shows a user device 12 with a display screen 14 and a user interface 416 split into a two sub-GUI portions 416A and 416B. Sub-GUI portion 416A is non-scrollable or fixed and sub-GUI portion 416B is scrollable upwardly and downwardly as shown by double arrow 418. In this example, the fixed sub-GUI portion 416A is at a top part 420 of the GUI 416 and the scrollable sub-GUI portion 416B is at a bottom part 422 of the GUI 416. The sub-GUI portion 416B is a scrollable endless page and sub-GUI portion 416A is a fixed page. The user's finger F scrolls page 418B upwardly or downwardly. As is scrolled upwardly it contiguously moves from the bottom part 422 towards the top part 420 but beneath page 416A and when the user scrolls downwardly, the page 416B scrolls from beneath page 416A into the bottom part 422.

In an embodiment, sub-GUI portion 416A is a media player streaming content 424 and sub-GUI portion 416 is scrollable page with thumbnails 426 which are clickable or otherwise controllable to display respective content.

Figure 10:
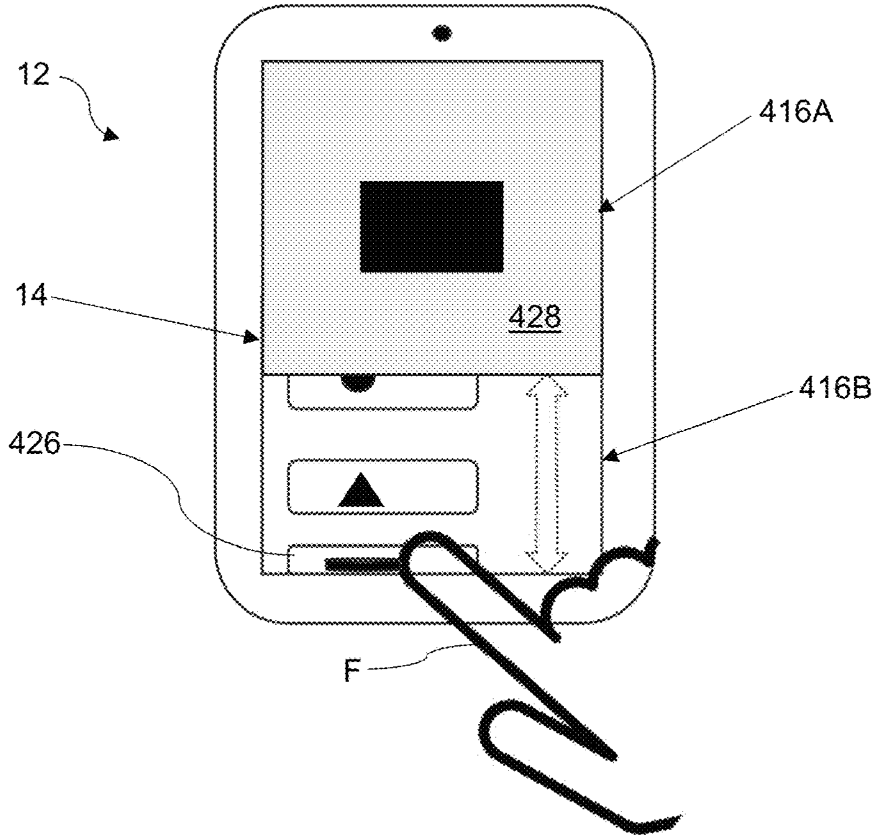
FIG. 10 is a schematic representation of the display screen of FIG. 9 showing a user clicking on a thumbnail in the scrollable sub-GUI for activation thereof in the fixed sub-GUI in accordance with a non-restrictive illustrative embodiment of the present disclosure.

In an embodiment, and as shown in FIG. 10, the user clicks on a thumbnail 426 and its content 428 is displayed in media player 416A replacing the previous content 424.

Figure 11:
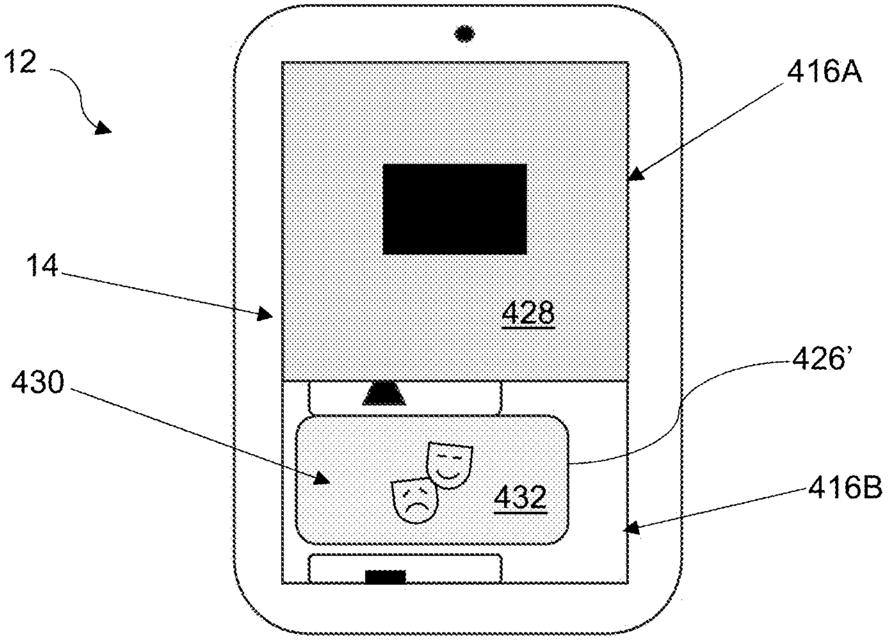
FIG. 11 is a schematic representation of the display screen of FIG. 9 showing the scrollable sub-GUI having a thumbnail therein that provides a media player in accordance with a non-restrictive illustrative embodiment of the present disclosure.

In an embodiment, and as shown in FIG. 11, the user clicks or otherwise inputs a command on a thumbnail 426' and that thumbnail opens a media player 430 streaming related content 432. In an embodiment, thumbnail 426' is opened into the media player 430 to stream content 432 by the system controller or a third party controller. In an embodiment the content 428 in the media player 416A is paused when the content 432 is being streamed. In an embodiment the system controller or the third party controller forces the content 428 to be paused for a predetermined period of time while the content 432 (such as an advertisement is being streamed) and following this predetermined time period the user can re-activated the steaming of 428 and disactivate the streaming of content 428 by inputting a command for stopping the content 428 from continuing to stream or skipping this content and the like. In an embodiment, when the thumbnail 426' opens media player 430, the media player is the same size as the thumbnail 426' or is fitted therein. In an embodiment, the media player 430 is enlarged to take a greater space of the bottom part 422.

Figure 12:
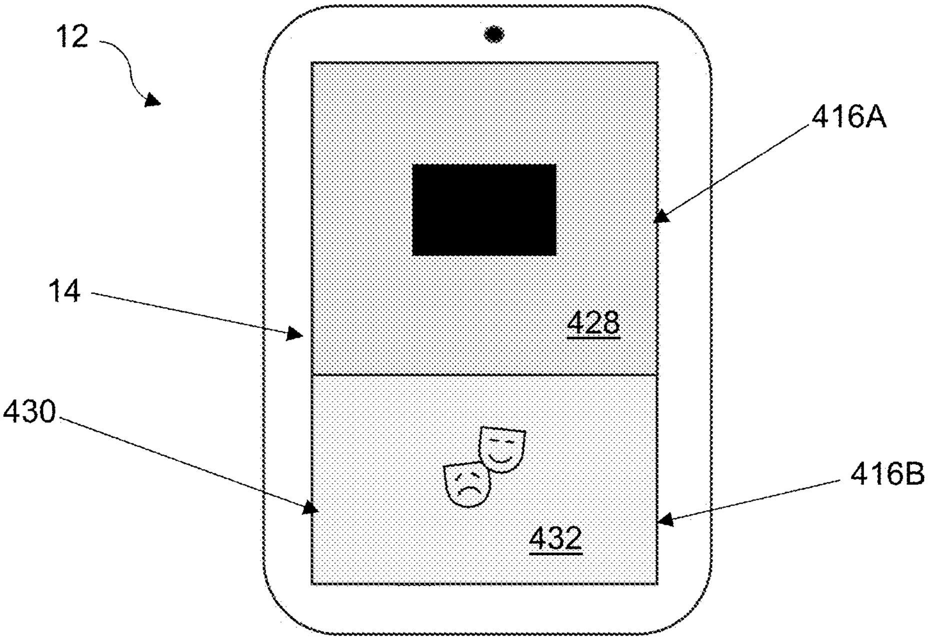
FIG. 12 is a schematic representation of the display screen of FIG. 9 showing the scrollable sub-GUI with the full size thereof being a media player in accordance with a non-restrictive illustrative embodiment of the present disclosure.

In an embodiment, and as shown in FIG. 12, the media player 430 enlarges to take the full space of bottom part 422.

Figure 13:
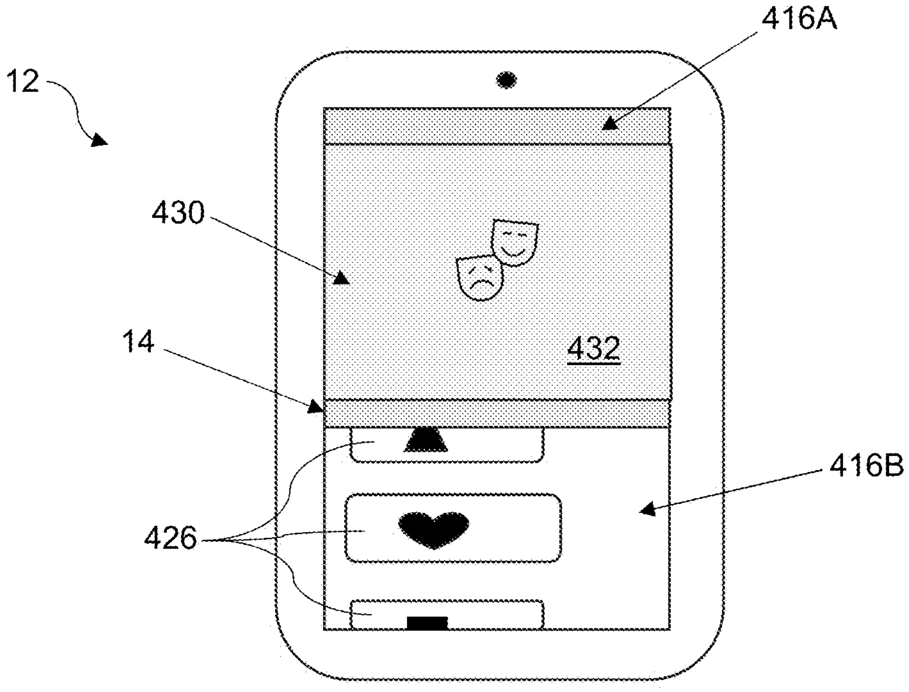
FIG. 13 is a schematic representation of the display screen of FIG. 9 showing a media player overlying the fixed sub-GUI in accordance with a non-restrictive illustrative embodiment of the present disclosure.

In an embodiment, and as shown in FIG. 13, the media player 430 is superimposed on the media player 416A.

In an embodiment, as the user scrolls through various thumbnails, they user may slow down at one thumbnail of interest but without opening and continue scrolling a higher speed as they are glossing over thumbnails of lesser interest. The system S provides for detecting a slower scrolling speed at a given thumbnail or even a short pause and thus will insert the same thumbnail or a similar thumbnail at further down the scrolled page to incite the user to take a second or even third look at this same or similar thumbnail and eventually open it for displaying the contents thereof. This is done during real time use. In another embodiment, the foregoing is stored by the system S in a profile memory of that user, in order for sub-portion 416B to display thumbnails of interest to the user based on their stored profile characteristics. For example, if a player usually slows down their scrolling speed to peruse thumbnails regarding furniture, baseball and videos of certain artists or the like the system will store these interests in their profile and the user during scrolling will see an increases in the thumbnails related to the foregoing interests.

Figure 14:
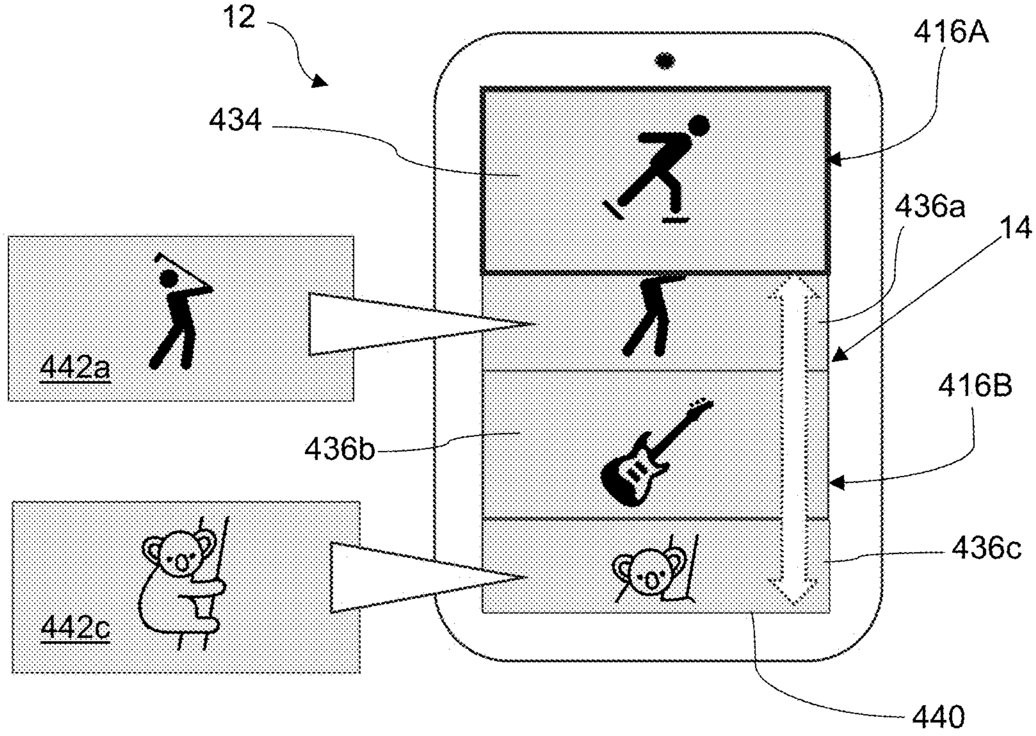
FIG. 14 is a schematic representation of a display screen and a user interface split into two sub-GUI portions, one portion being scrollable and the other non-scrollable or fixed, the fixed sub-GUI containing a main medial player and the scrollable sub-GUI containing a plurality of auxiliary media players in accordance with a non-restrictive illustrative embodiment of the present disclosure.

In an embodiment and as shown in FIG. 14, the sub-portion 416A comprises a fixed main media player 434, and the sub-portion 416B comprises a plurality of auxiliary media players 436*a*, 436*b*, 436*c*.

The system S provides for streaming the content of a selected one of the auxiliary media players, such as 436B for example. When media player 436*b* is streamed, the streaming in the main media player 434 pauses, and then continues after a short time interval, the auxiliary media player 436*b* continues to stream the content 438 thereof but without any sound. In this way, advertisers can get the attention of a media viewer, enjoying a stream in the main media player, by pausing the stream as they activate sub-portion (i.e. 436*b*) of the scrollable sub-GUI (416B) to stream content with sound and then allow the main content in the main media player (i.e. 434) to continue streaming as the sound from the sub-portion (i.e. 436B) of the scrollable sub-GUI (416B) is muted. This provides an advertisement stream in tandem with the main content stream. The stream in media player 436B can eventually be stopped by the system S (including by the system controller or a third party controller) and/or the user directly. Thus, an advertisement without sound in a sub-portion of the secondary or auxiliary sub-GUI streaming in tandem with the main content will be in the peripheral vision of the user looking at the display, the user can thus enjoy the main content and view the advertisement providing a greater ability of advertisers to reach clients without the annoyance of interrupting their stream.

Indeed, this is not only useful for advertisements, but also messages can also be displayed via the sub-portion of the auxiliary sub-GUI such as third party announcements, or social media communications or chatbots and the like.

FIG. 14 shows the media players 438*a* and 438*b* being respectively partially cropped by the main media player 434 and the bottom edge 440 of the display 14 but when scrolled to be fully visible, the full contents 442*a* and 442*c* thereof are displayed.

The system S provides for viewing a stream from a given platform such as YouTube™ in the main media player 434 whereas the sub-GUI 416B includes media players carrying content from other platforms such a Vimeo™, Rumble™, DailyMotion™ for example. The media players do not have to be from the same platform. The content of the media players can be based on the profile of users which is stored in a system memory either via input commands by the user or by the system S tracking a user's activity. Thus, the system creates its own platform wherein one sub-GUI 416A contains a main media player 434 for displaying content from the system controller or from third party controllers and the other sub-GUI contains a media players for displaying content from the system controller or from third party controllers.

The advertisements streamed in media player 438*a*, 438*b* or 438*c* of the sub-GUI 416*b* does not have to be related to the thumbnail of that media player, therefore a third party can simply use the media player window of 438*b* for example to display unrelated commercial content.

Thus, in an embodiment, a third party server or the system controller directly or via request by a third party server provides for stopping/pausing the main window frame 416A and streaming a media player in the auxiliary window frame 416B or even popping up new media player frame that was not in the list of media players displayed in window frame 416B.

In an embodiment, the media players or thumbnails or sub-portions of sub-GUI 416B displayed thereon are refreshed when the user is not scrolling the page 416B, therefore new media players, thumbnails or other like sub-portions of the sub-GUI 416B are displayed.

The black areas along the top and bottom of a video, also known as letterboxing occur when films shot in a wide aspect ratio get resized to fit standard-width video players. Sometimes, these black areas also occur when a media player window is resized or when the display screen of a mobile device is turned from the vertical position to the horizontal position.

Figure 15:
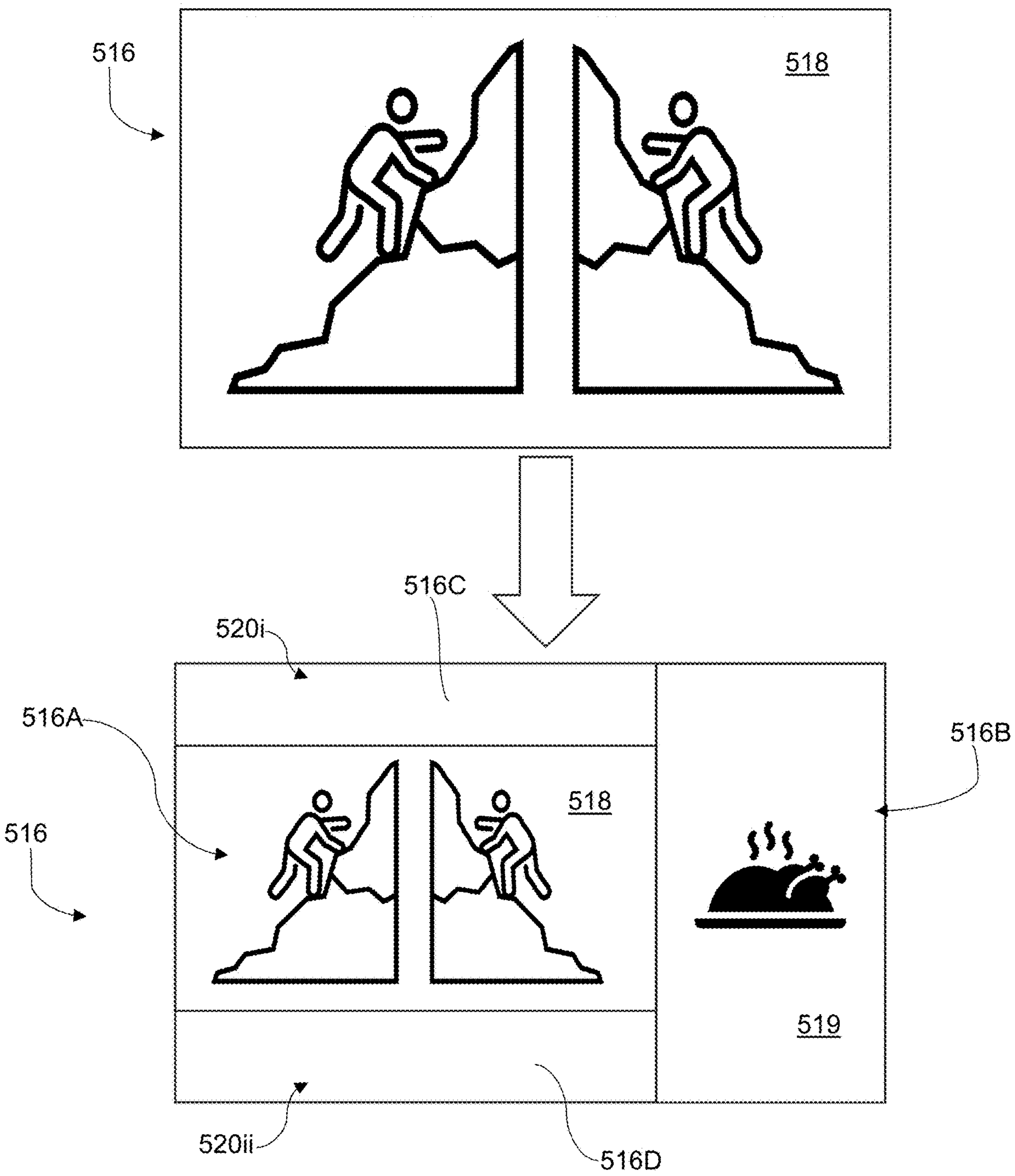
FIG. 15 is a schematic representation of a GUI split into two sub-GUIs with black areas being created in accordance with a non-restrictive illustrative embodiment of the present disclosure.

FIG. 15 shows a graphical user interface 516 streaming main content 518, the GUI is split into two sub-GUIs, 516A and 516B. GUI 516A continues to stream the main content 518 (such as a TV show for example) whereas 516B stream auxiliary content 519 (such as a commercial for example). The configuration of the sub-GUIs 516A and 516B provides for black horizontal areas 520*i*, 520*ii* above and below the main sub-GUI 516A. The system S (via the system control, third party controller, device controller and combinations thereof) provides for detecting the black areas 520*i* and 520*ii* and for providing for further sub-GUIs, 516C and 516D to be respectively created therein for displaying further auxiliary content. This further auxiliary content can be provided by the system controller directly or via third parties to display advertisements, social media content, important messages to the user (based on user profile parameters) and the like.

Figure 16:
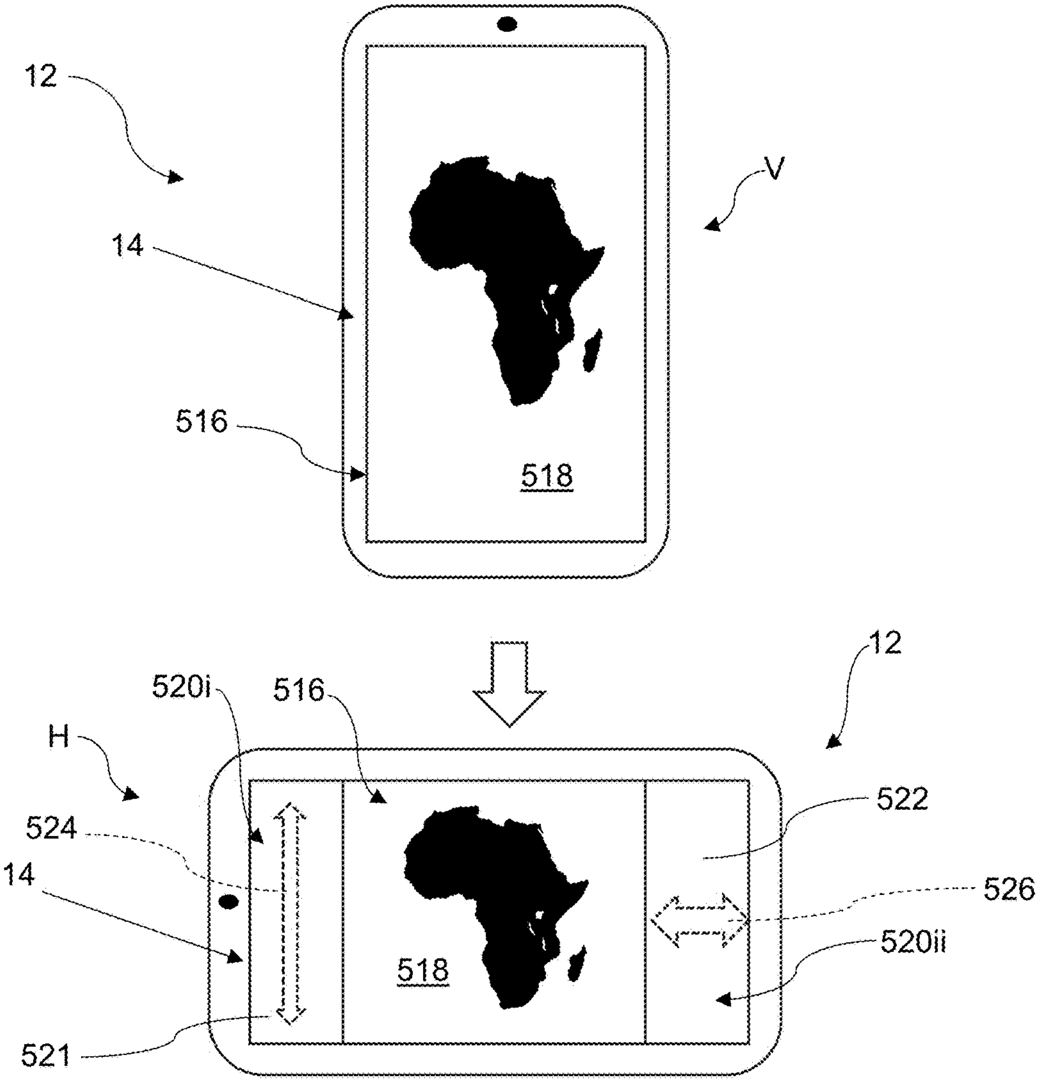
FIG. 16 is a schematic representation of a user device with a display screen displaying a GUI and being moved from a vertical position to a horizontal position thereby creating black areas which are provided with respective scrollable sub-GUIs being respectively vertically and horizontally scrollable in accordance with a non-restrictive illustrative embodiment of the present disclosure.

In an embodiment shown in FIG. 16, a user moves their user device 12 from a vertical position V to a horizontal position H thereby moving the display screen 14 from a vertical position to the horizontal position as well. The display screen 14 displays GUI 516 which streams content 518 and when the screen 14 moves in the horizontal position H, the GUI 516 readjusts creating black areas 520*i* and 520*ii*, the system S creates sub-GUIs 521 and 522 within areas 520*i* and 520*ii* respectively and as such the original GUI 516 now in the horizonal position streamlining content 518 can also be considered as a sub-GUI or the main GUI. The sub-GUIs 521 and 522 provide for displaying respective content originating from the system controller, the same or different third party controllers, the device controller, and combinations thereof. In the example shown here, the sub-GUI 521 is a vertically scrollable page (as shown by arrow 524) which can include thumbnails, media players or other sub-portions thereof as explained herein, whereas the sub-GUI 521 is a horizontally scrollable page (as shown by arrow 526) which can also include thumbnails, media players or other sub-portions thereof as explained herein. Of course, either one of the sub-GUIs 521 and 522 may be vertically or horizontally scrollable.

Figure 17:
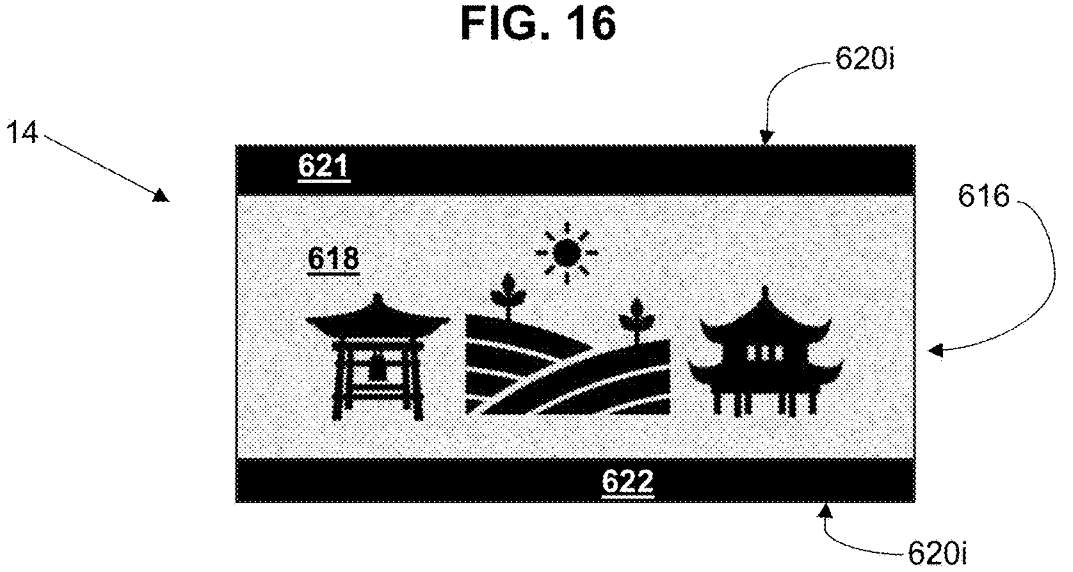
FIG. 17 is a is a schematic representation of a user device with a display screen displaying a GUI and black areas in accordance with a non-restrictive illustrative embodiment of the present disclosure.

Turning to FIG. 17, there is shown an embodiment of the display 14 such as a large screen smart television displaying a GUI 616 streaming movie content 618. The shape of the GUI 616 produces black horizontal top and bottom black areas 620*i* and 620*ii*, respectively, which the system can use to display GUIs 621 and 622 respectively, thereby providing for advertisement for example to be simultaneously displayed while the user enjoys content 618 without interruption thereof.

Figure 18:
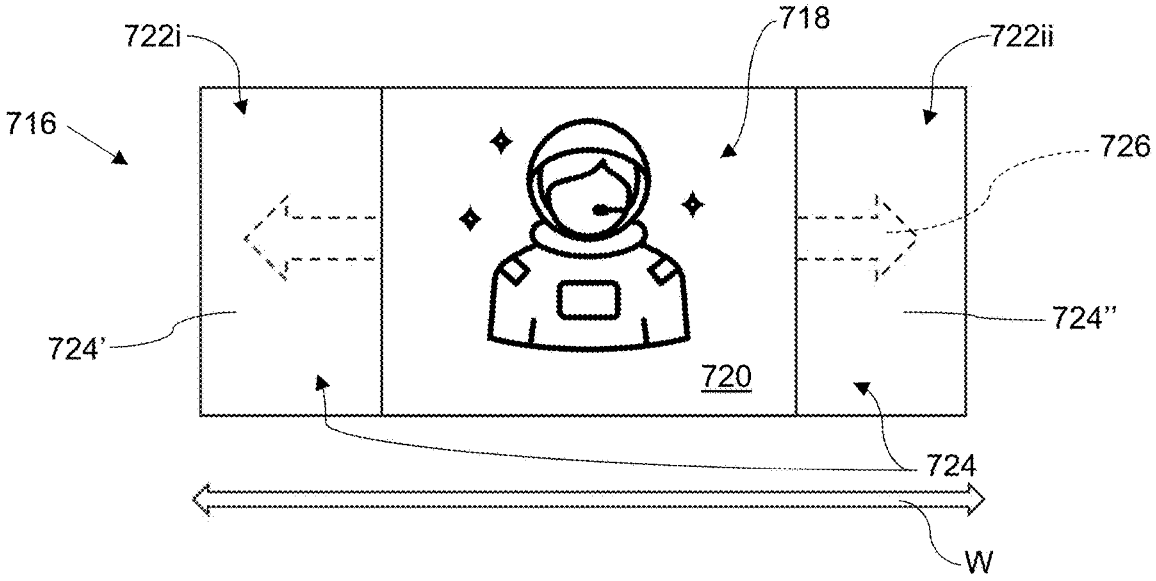
FIG. 18 is a schematic representation of a GUI with a non-scrollable sub-GUI overlying a horizontally scrollable sub-GUI in accordance with a non-restrictive illustrative embodiment of the present disclosure.

In an embodiment and as shown in FIG. 18, a GUI 716 includes a main sub-GUI 718 displaying main content 720. In an embodiment, the main sub-GUI 718 is flanked at both its left and right sides by black areas 722*i* and 722*ii*, with the system S providing for creating an auxiliary sub-GUI 724 thereon. In this illustrated example, the sub-GUI 724 has a greater width than the width of the main sub-GUI 718 and indeed, the sub-GUI 718 overlies or is superimposed on the sub-GUI 724, as such the sub-GUI 724 includes a left portion 724' thereof and a right portion 724" thereof respectively positioned at the black areas 722*i* and 722*ii*. In an embodiment, the sub-GUI 724 is a page that is horizontally scrollable as shown by arrow 726 beneath the sub-GUI 718 which is generally centrally positioned along the width W of GUI 716.

Figure 19:
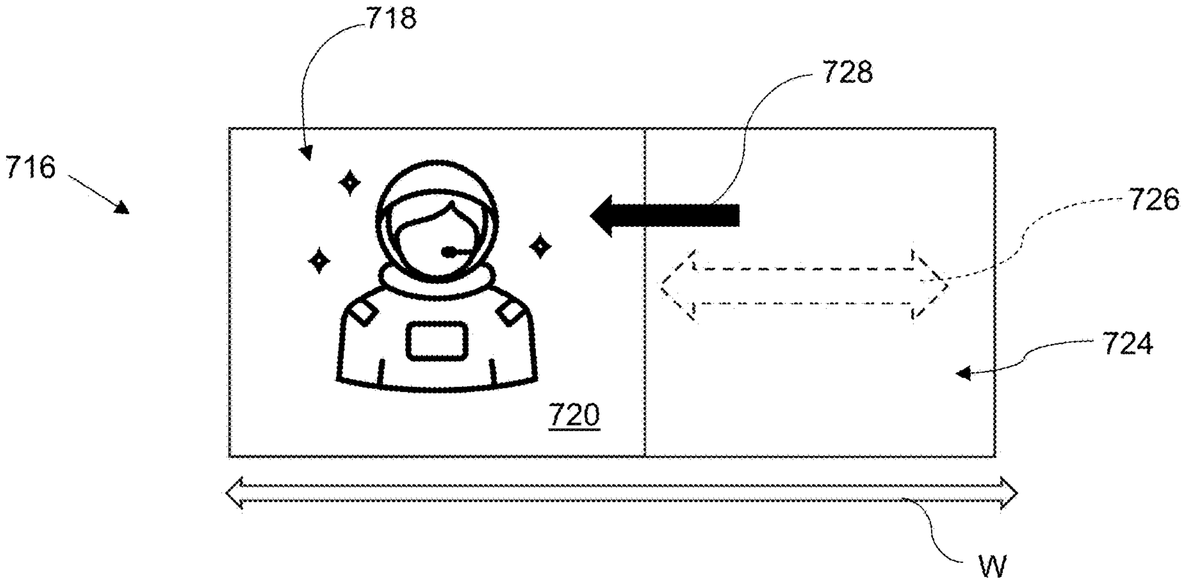
FIG. 19 is a schematic representation of the GUI of FIG. 18 with the non-scrollable sub-GUI being movable along a width of the scrollable sub-GUI in accordance with a non-restrictive illustrative embodiment of the present disclosure.

In an embodiment, and as shown in FIG. 19, the main sub-GUI 718 is movable along the GUI 716 via a user input command. Therefore, the user can "slide" the GUI 716 towards the left as shown by arrow 728 thereby increasing the space 730 on the right of the GUI 716 and in essence combining the sub-GUI portions 724' and 724" in one contiguous GUI frame 724 next to GUI 718. The GUI page 724 is horizontally scrollable as shown by arrow 726 with the content thereof scrolling underneath the main sub-GUI 718 when scrolled to the far left. Indeed, the sub-GUI 718 can be moved to the right of the GUI 716 or anywhere along the width W of the GUI 716 via user input commands as provided herein.

Figure 20:
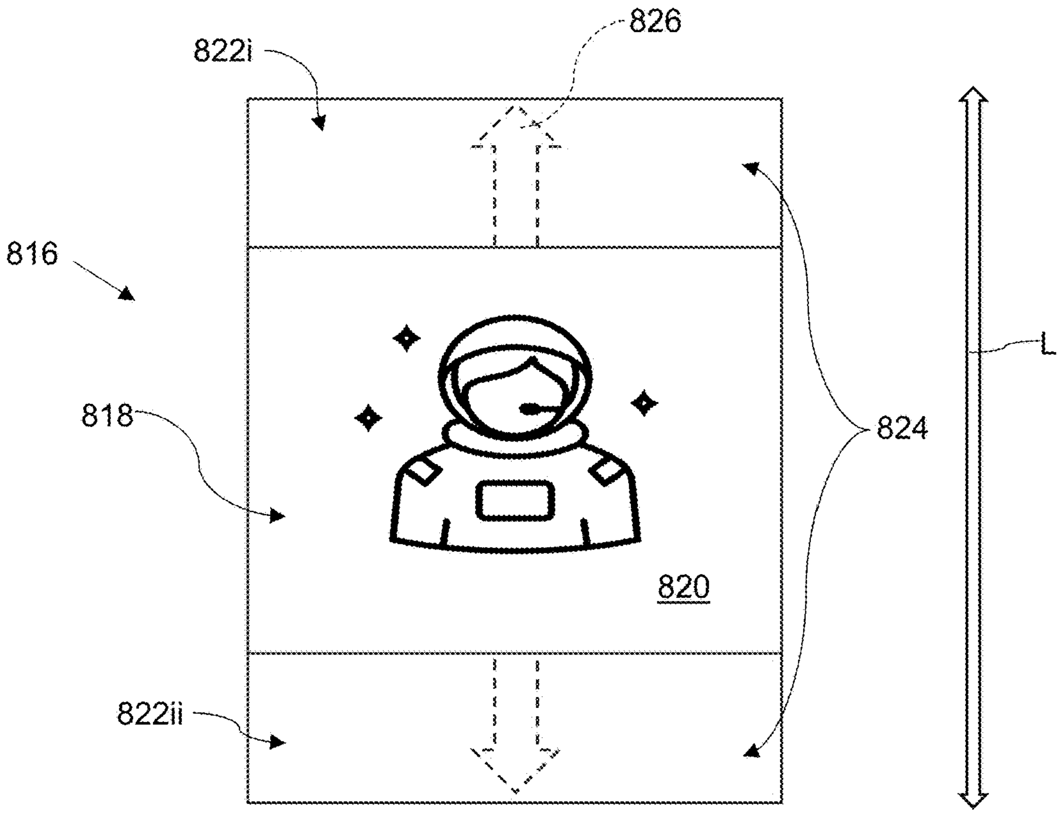
FIG. 20 is a schematic representation of a GUI with a non-scrollable sub-GUI overlying a vertically scrollable sub-GUI in accordance with a non-restrictive illustrative embodiment of the present disclosure.

In an embodiment and as shown in FIG. 20, a GUI 816 includes a main sub-GUI 818 displaying main content 820. In an embodiment, the main sub-GUI 818 is flanked at both its top and bottom sides by black areas 822*i* and 822*ii*, with the system S providing for creating an auxiliary sub-GUI 824 thereon. In this illustrated example, the sub-GUI 824 has a greater length than the length of the main sub-GUI 818 and indeed, the sub-GUI 818 overlies or is superimposed on the sub-GUI 824, as such the sub-GUI 824 includes a top portion 824' thereof and a bottom portion 824" thereof respectively positioned at the black areas 822*i* and 822*ii*. In an embodiment, the sub-GUI 824 is a page that is vertically scrollable as shown by arrow 826 beneath the sub-GUI 818 which is generally centrally positioned along the length L of GUI 816.

Figure 21:
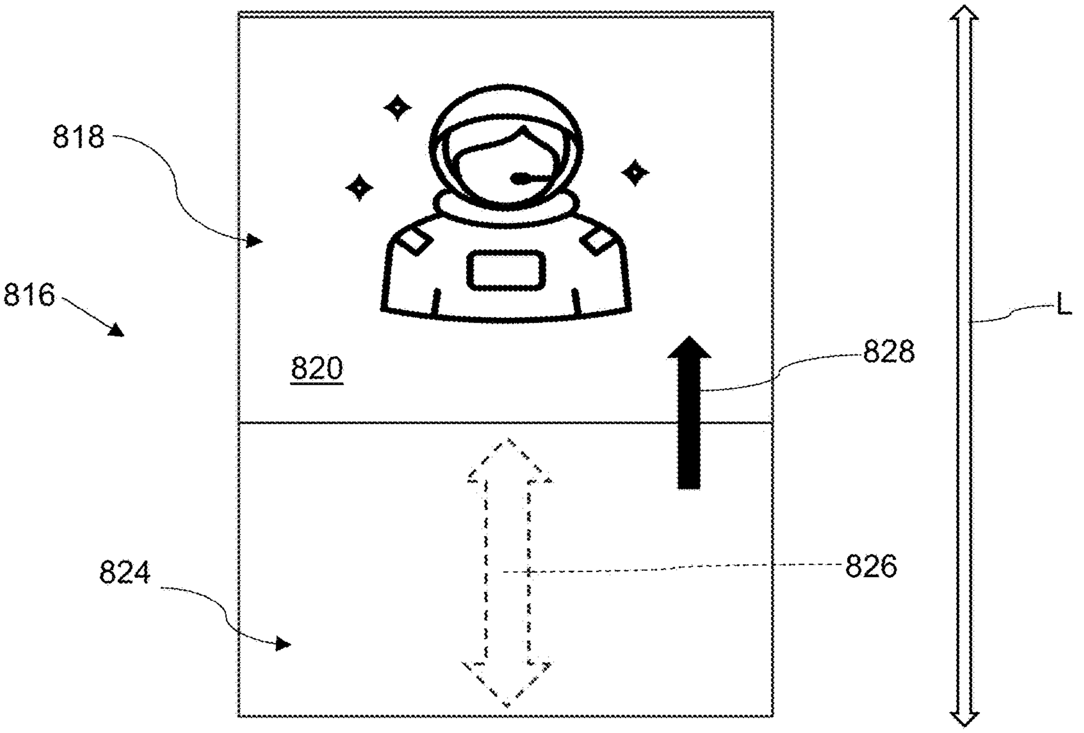
FIG. 21 is a schematic representation of the GUI of FIG. 20 with the non-scrollable sub-GUI being movable along a length of the scrollable sub-GUI in accordance with a non-restrictive illustrative embodiment of the present disclosure.

In an embodiment, and as shown in FIG. 21, the main sub-GUI 818 is movable along the GUI 816 via a user input command. Therefore, the user can "slide" the GUI 816 towards the top as shown by arrow 828 thereby increasing the space 830 on the bottom of the GUI 716 and in essence combining the sub-GUI portions 824' and 824" in one contiguous GUI frame 824 beneath GUI 718. The GUI page 824 is vertically scrollable as shown by arrow 826 with the content thereof scrolling underneath the main sub-GUI 818 when scrolled upwardly. Indeed, the sub-GUI 818 can be moved to the bottom of the GUI 816 or anywhere along the width L of the GUI 816 via user input commands as provided herein.

Figure 22:
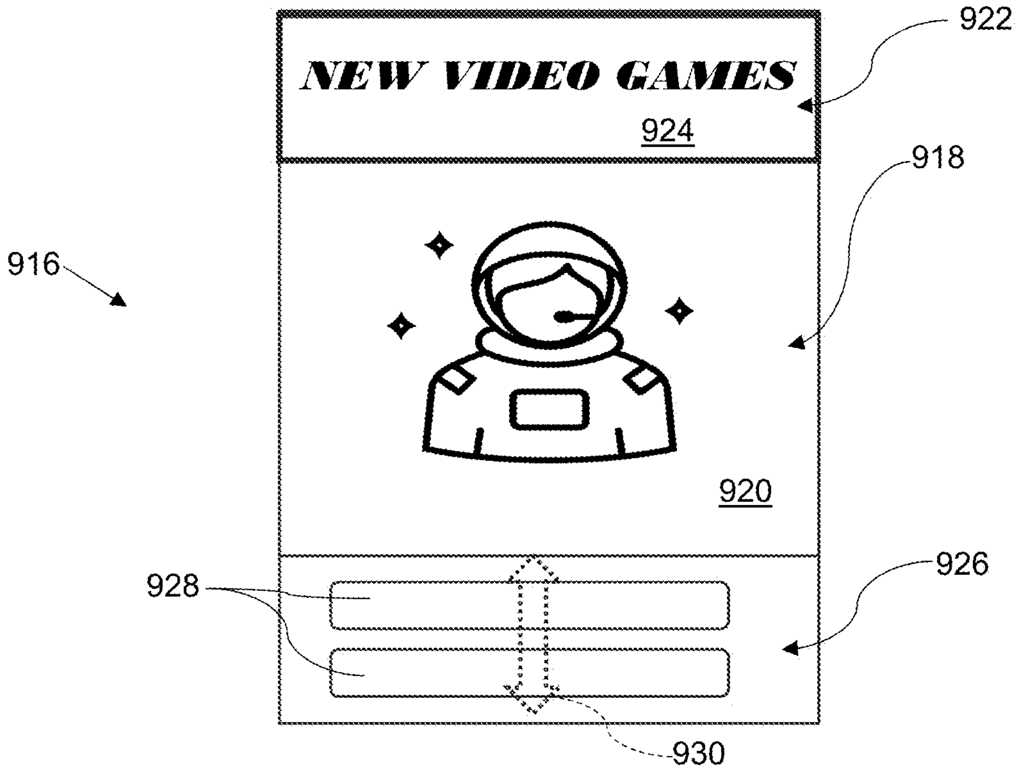
FIG. 22 is a schematic representation of GUI comprising a main content sub-GUI, a first auxiliary non-scrollable sub-GUI and a second auxiliary scrollable sub-GUI containing media thumbnails in accordance with a non-restrictive illustrative embodiment of the present disclosure.
Figure 23:
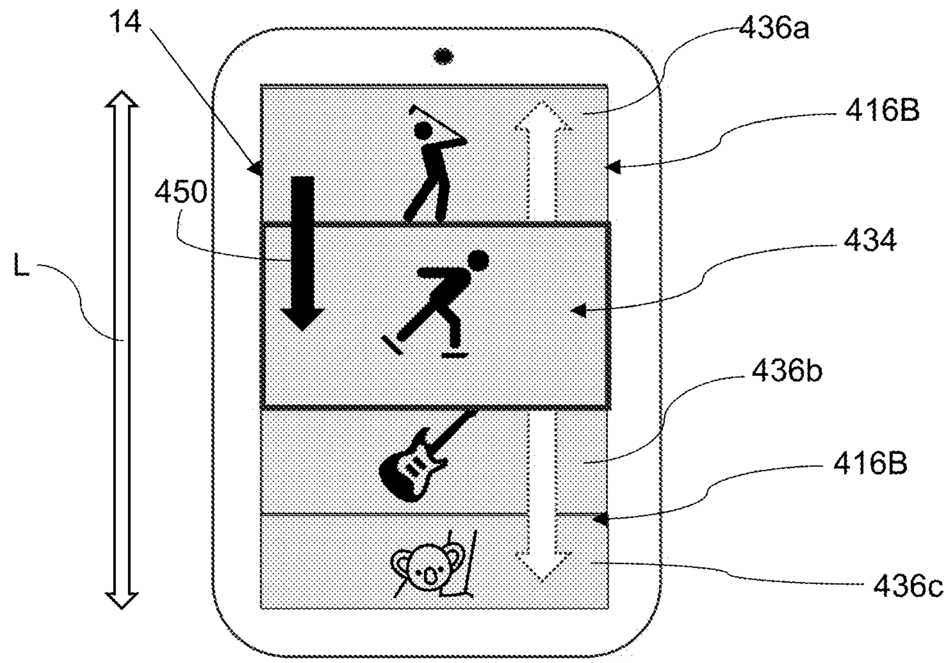
FIG. 23 is a schematic representation of the display screen and GUI of FIG. 14, with the main media player being movable and repositionable along the scrollable sub-GUI containing the auxiliary media players in accordance with a non-restrictive illustrative embodiment of the present disclosure.

In an embodiment as shown in FIG. 22, a GUI 916 comprises a main sub-GUI 918 displaying content 920, such as a movie, a video game, and the like. The main sub-GUI 918 is flanked at the top by a fixed auxiliary sub-GUI 922 that is not scrollable and displays auxiliary content 924. The main sub-GUI 918 is also flanked at its bottom by a scrollable auxiliary sub-GUI 926 including a plurality of thumbnails 928, the sub-GUI page 926 is scrollable upwardly and downwardly as shown by arrow 930. In an embodiment, content 924 is an advertisement that is streamed in tandem with the main content 920 but without interference therewith (e.g. without any sound). In an embodiment, one of the thumbnails 928 can be "opened" into a media player taking the space on GUI 916 provided for sub-GUI 926 and stream other content (advertisement, message etc.). The foregoing can be controlled by the system controller, one or more third party controllers, the device controller and combinations thereof. Alternatively, the foregoing media player "pop up" is not related to a displayed thumbnail 928 but rather to a "random" window appearing for content display. In an embodiment, the user selects one of the thumbnails 928 for "popping up" as provided herein. In any event, whether system selected or user selected "pop up" of a new media player window, the main content 920 may be paused and the new content of this new media player window is streamed for a brief period of time as previously explained. In another embodiment, the user can select an thumbnail 928 in order for its related content to be displayed in the fixed auxiliary sub-GUI 922.

Figure 24:
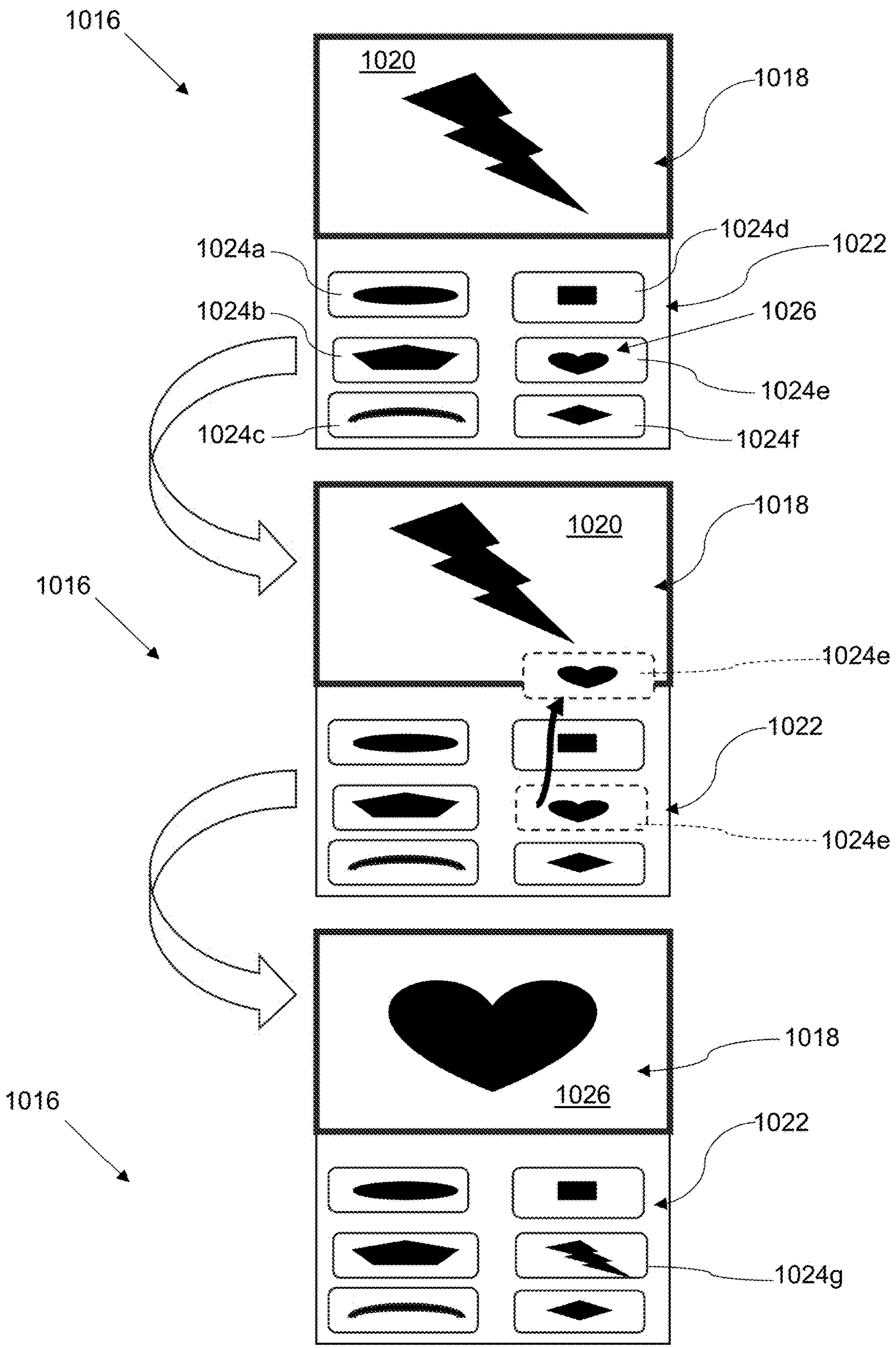
FIG. 24 is a schematic representation of a GUI comprising a sub-GUI containing a media player displaying main content, another sub-GUI containing thumbnails with a selected thumbnail being drag and dropped into the main medial player to replace the content thereof.

With reference to FIGS. 14 and 24, the fixed media player or main GUI 434 is movable (via user input commands therefor) along the length L of the GUI 416 to another position and therefore "slides" on the sub-GUI or scrollable GUI 416B over the plurality of auxiliary media players 436*a*, 436*b*, 436*c*. In this case, the user has moved the main GUI 434 downwardly as shown by arrow 450. The scrollable GUI pages 416B remains scrollable beneath the main GUI 434 with media auxiliary players 436*a*, 436*b*, 436*c* or portions thereof being visible in the top and bottom areas 452 and 454, respectively, of the GUI 416 that are not covered by the main GUI 434.

With reference to FIG. 24, there is shown a GUI 1016 in accordance with an embodiment of the present disclosure, comprising a fixed main sub-GUI 1018 displaying main content 1020 and an auxiliary scrollable sub-GUI 1022 comprising a plurality of thumbnails 1024*a*, 1024*b*, 1024*c*, 1024*d*, 1024*e*, 1024*f*. The user via input commands therefor can "slide" a given thumbnail such as 1024*e* from the sub-GUI 1022 and drop it in the main sub-GUI 1018 thereby replacing content 1020 by content 1026 which is related to thumbnail 1024*e*. The content 1020 can reappear as a thumbnail 1024*g* in scrollable sub-GUI 1022.

In an embodiment, the system S provides for more than one media players on the GUI (or on the user's device screen), a given first medial player is activated by the user via input commands and thus streamed. The system S stops or pauses this media player and streams another one. In an embodiment, the system S provides for re-sizing any of the media players. In an embodiment, the user can mute the media player controlled by the system S but cannot stop the stream thereof. In an embodiment, the system S can play a video on the GUI 16 without the removing the media player currently streamed by the user via input commands. In an embodiment, the system S refreshes the thumbnails available on the screen 14 except for the currently streamed media player selected by the user. In an embodiment, the system S automatically controls the sound of at least two media players namely, the currently played/streamed media player and another media player selected automatically by the system controller. The system S automatically pauses the currently played/streamed media player in order to allow the auxiliary content to stream but the user can mute, pause this auxiliary content without removal and indeed may change the content streamed on their main media player.

The various features described herein can be combined in a variety of ways within the context of the present disclosure so as to provide still other embodiments. As such, the embodiments are not mutually exclusive. Elements of the embodiments and examples discussed can be combined within the context of the disclosure as those having skill in the art will readily appreciate. Moreover, the embodiments discussed herein need not include all of the features and elements illustrated and/or described and thus partial combinations of features can also be contemplated. Furthermore, embodiments with less features than those described can also be contemplated.

It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A system for modulating a graphical user interface (GUI), the system comprising:

a user device comprising a device controller with an associated memory and a display interface for displaying the GUI, the GUI defining a frame boundary thereof further defining a GUI size, the GUI comprising content displayed via the display interface; and a system controller in communication with the user device, the system controller having a processor with an associated memory of processor executable code for being executed by the system controller or for being downloaded into the memory of the user device controller to be executed thereby or to be executed synergistically by a combination of the system controller and the device controller, wherein execution of the processor executable code by the system controller or by the device controller or by the combination thereof synergistically provides for the system controller or the device controller or the combination thereof with performing computer-implementable steps comprising:

detecting a size, shape and configuration of the display interface to to divide the display interface into at least a first and second display interface portions;

splitting the GUI into at least two sub-GUI portions positioned within the GUI frame boundary, one of the at least two sub-GUI portions being a main sub-GUI and being positioned within the first display interface portion, the other of the at least two sub-GUI portions being an auxiliary sub-GUI and being positioned within the second display interface portion, the main sub-GUI and the auxiliary sub-GUI being separated by a visible border therebetween;

providing the main sub-GUI to display a main media player for streaming main content selected by the user via input commands therefor and stored within the user device and/or hosted by the system controller and/or a same or different remote host controllers in communication with the user device;

providing the auxiliary sub-GUI to display a plurality of auxiliary media thumbnails, the auxiliary sub-GUI being scrollable within the frame boundary and relative to the visible border so as to provide only a given number of the plurality of the auxiliary media thumbnails to be positioned in the second display interface portion, wherein each thumbnail represents a respective auxiliary content type, wherein continued scrolling another given number of the plurality of the auxiliary media thumbnails to be positioned in the second display interface portion;

providing the user via input commands therefor to open a user chosen one of the media thumbnails positioned within the second display interface portion to provide a media player within the auxiliary sub-GUI that is enlarged relative to the media thumbnails for streaming user chosen auxiliary content;

when the user has not opened a user chosen one of the media thumbnails positioned within the second display interface portion, automatically opening without user input commands therefor a system chosen one of the media thumbnails positioned within the second display interface portion to provide a media player within the auxiliary sub-GUI that is enlarged relative to the media thumbnails for streaming system chosen auxiliary content.

2. A system according to claim 1, further comprising the computer-implementable step of modulating the media thumbnails appearing in the second interface display portion according to auxiliary content type based on user scrolling speed.

3. A system according to claim 1, further comprising the computer-implementable step of simultaneously automatically pausing the main content in the main media player during streaming of the system chosen auxiliary content for a given time period after which the main content resumes streaming.

4. A system according to claim 1, further comprising the computer-implementable step of simultaneously automatically muting the main content in the main media player during streaming of the system chosen auxiliary content for a given time period after which the main content is unmuted.

5. A system according to claim 1, further comprising the computer-implementable step of bocking user input commands for stopping streaming and/or muting of the auxiliary content until completion of a given time period.

6. A system according to claim 1, further comprising the computer-implementable step of providing for relatively resizing the main sub-GUI and auxiliary sub-GUI within the frame boundary by moving the visible border.

* * * * *